(12) United States Patent
Korn

(10) Patent No.: US 10,311,864 B2
(45) Date of Patent: Jun. 4, 2019

(54) WRITTEN WORD REFINEMENT SYSTEM AND METHOD FOR TRUTHFUL TRANSFORMATION OF SPOKEN AND WRITTEN COMMUNICATIONS

(71) Applicant: Zamir Korn, Huntington, NY (US)

(72) Inventor: Zamir Korn, Huntington, NY (US)

(73) Assignee: TRUTHFUL SPEAKING, INC., Huntington, NY (US)

(*) Notice: Subject to any disclaimer, the term of this patent is extended or adjusted under 35 U.S.C. 154(b) by 0 days.

(21) Appl. No.: 15/667,271

(22) Filed: Aug. 2, 2017

(65) Prior Publication Data

US 2017/0330559 A1 Nov. 16, 2017

Related U.S. Application Data

(63) Continuation-in-part of application No. 15/246,162, filed on Aug. 24, 2016, now Pat. No. 9,727,555, (Continued)

(51) Int. Cl.
*G06F 3/16* (2006.01)
*G09B 5/06* (2006.01)
(Continued)

(52) U.S. Cl.
CPC .......... *G10L 15/1815* (2013.01); *G06F 3/167* (2013.01); *G06F 17/274* (2013.01);
(Continued)

(58) Field of Classification Search
CPC ..... G06F 17/274; G06F 17/2785; G09B 5/06; G10L 15/1815
See application file for complete search history.

(56) References Cited

U.S. PATENT DOCUMENTS 6,332,143 B1* 12/2001 Chase ................. G06F 17/27
7,013,263 B1* 3/2006 Isaka ................. G06Q 10/10
704/9
(Continued)

OTHER PUBLICATIONS

Microsoft, "Microsoft Computer Dictionary, Fifth Edition", Microsoft Press, 2002. (Year: 2002).*
(Continued)

*Primary Examiner* — Brian L Albertalli
(74) *Attorney, Agent, or Firm* — Alfred M. Walker; John F. Vodopia

(57) ABSTRACT

A method for processing a user's spoken communication that is received by the user's electronic communications device and converted to text thereby, to assess relationships between words and phrases in the spoken communication, where necessary, to generate a directive to the user on how he/she might modify future spoken communications to more clearly convey a semantic content intended, for purposes of self-help and self-training in the user's spoken communications. The method also generates unsolicited text based on preprogrammed instructions. The user can configure the method in such a way that the user, not the software application program operating in the electronic communications device, contribute to the final directive. A version modifying original spoken text with complete sentences, and another, called user-mediated, that only identifies keywords or phrases and makes suggestions from word phrase pools to the user with modified keywords and phrases, to produce a directive are described.

32 Claims, 5 Drawing Sheets

Related U.S. Application Data which is a continuation of application No. 14/553,338, filed on Nov. 25, 2014, now Pat. No. 9,436,676.

(51) Int. Cl.

| | | |
|---|---|---|
| *G06F 17/27* | (2006.01) | |
| *G09B 19/00* | (2006.01) | |
| *G10L 13/00* | (2006.01) | |
| *G10L 15/18* | (2013.01) | |
| *G10L 15/22* | (2006.01) | |

(52) U.S. Cl.
CPC ......... *G06F 17/2785* (2013.01); *G09B 19/00* (2013.01); *G10L 13/00* (2013.01); *G10L 15/22* (2013.01); *G09B 5/06* (2013.01)

(56) References Cited

U.S. PATENT DOCUMENTS

| | | | | |
|---|---|---|---|---|
| 8,788,263 | B1* | 7/2014 | Richfield | G06F 17/30864 704/9 |
| 8,898,098 | B1* | 11/2014 | Luechtefeld | G06Q 10/10 704/257 |
| 2011/0054985 | A1* | 3/2011 | Ricci | G06Q 10/00 705/7.41 |
| 2013/0073279 | A1* | 3/2013 | Mills | G06F 17/2229 704/9 |
| 2013/0179440 | A1* | 7/2013 | Gordon | G06Q 10/06 707/731 |
| 2015/0194149 | A1* | 7/2015 | Faizakof | G10L 15/1815 704/257 |

OTHER PUBLICATIONS

Jon Kabat-Zinn, Mindefulness-Based Interventions in Context: Past Present and Future, Commentaries, DOI:10.1093/clipsy/bpg016, American Psychological Association D12, 2003 pp. 144-156.

Steven C. Hayes and Spencer Smith, Get Out of you Mind & Into your Life: the new acceptance and commitment therapy. New Harbinger Publications, Inc., 2005, 13 pages.

Steven C. Hayes, Whats the best form of Psychotherapy? How can you overcome sadness? Controversial Pschologist Steven Hayes has answer: Embrace the pain by John Cloud Times Magazine Article, 2006, 5 pages.

F. Perls, Gestalt Therapy Verbatim, 1969, pp. 25-37.

Jon Kabat-Zinn, Wherever you go there you are, 1994, 8 pages.

Dwight Goddard, A Buddhist Bible, 1970, pp. 85-107.

Joen Fagan and Irma Lee Shepherd, Gestalt Therapy Now, 1970, 23 pages.

\* cited by examiner

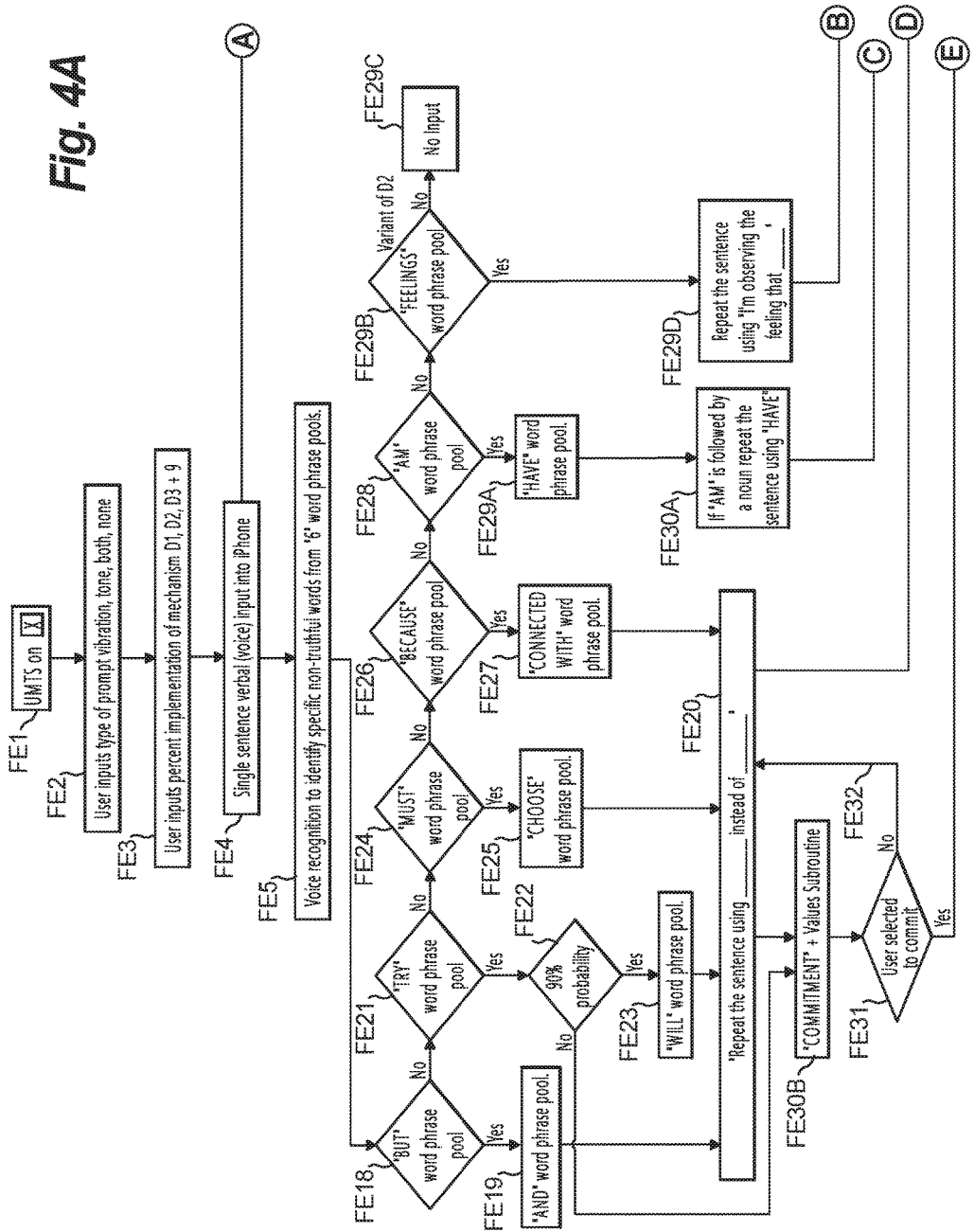

WRITTEN WORD REFINEMENT SYSTEM AND METHOD FOR TRUTHFUL TRANSFORMATION OF SPOKEN AND WRITTEN COMMUNICATIONS

CROSS-REFERENCE TO RELATED APPLICATIONS

This application is a continuation-in-part (CIP) application of U.S. patent application Ser. No. 15/246,162, filed on Aug. 24, 2016. The '162 application is a continuation of U.S. patent application Ser. No. 14/553,338, filed on Nov. 25, 2014 ("the parent application"), now U.S. Pat. No. 9,436,676 B1, dated Sep. 6, 2016, the contents of which parent applications are incorporated herein by reference. Applicant claims priority from the '162 and '338 applications under 35 USC § 120 therefrom.

BACKGROUND OF THE INVENTION

The invention is related to a system and method for modifying, or suggesting modifications, to a user's communications, where the modified communications more accurately and truthfully convey the user's underlying semantic intent than would the unmodified communications, and also provides the user with the reasoning behind the modifications, or proposed modifications, so that he/she realizes not only a modified communication, for example, a text message, email message, a verbal expression, or proposal for such modifications, but also is exposed to the rules underlying the modified or proposal to modify the communication.

There are two classes of feedback mechanisms that comprise the invention, Corrections and Insertions. Corrections identify specific user-generated words that are disempowering, and give suggestions from selected word phrase pools on restating them in a more empowering way. Empowerment is defined as the generation of actions in the direction the user values even when these actions may contradict a person's beliefs or emotions. A main goal of empowerment is to enhance the person's ability to obtain a valued goal even in the face of mental doubt or fear. More specifically, empowerment mediated by correction mechanisms are most prominently expressed by the mechanism associated with Commitment. When the user utilizes the app, they are introduced to the possibility that they can always think and feel one way and act another way.

Empowered actions mediated by insertion mechanisms prompts the user to begin their next sentence using words or phrases that enhance a fuller expression of objectivity and experiential presence. The goal of Insertions is to have users be more mindful of the thoughts, ideas, and emotions they are experiencing. Research has shown that Mindfulness-based psychotherapies (Kabat-Zinn Jon; Univ. of Mass. Medical School, "Mindfulness-Based Interventions in Context: Past, Present and Future," Commentaries, DOI: 10.1093/clipsy/bpg016, American Psychological Association D12, 2003, pages 144-156) decrease a variety of stressors, and physical pain. Lastly, Insertions mechanisms guide users in distinguishing between the essence of who they and others are, contrasted with the possessions that they have. This distinction is particularly espoused by Gestalt Therapy (Perls, 1969, Fagan, 1970.).

One of the most prominent, empirically validated psychotherapies, Acceptance and Commitment Therapy (ACT) (Hayes, 2006, Hayes, 2005) shows that most people speak and write in a style that disempowers their actions and invalidates themselves and others. For example, the written or verbal communication: "I will try to get that task done" can readily be interpreted as communicating an underlying meaning that the speaker will not get the task done. If one "tries" to raise their hand, by definition they are not actually raising their hand. Truthfully (that is, communicating that they "will try to get the task done"), the speaker is literally stating that he/she will not do the task. A more truthful way of communicating this is "1 will do the task" or "I will not do the task." And most people are unaware of this style of communicating whether they are the ones generating the communication (verbal or written) or receiving it.

There are reinforcing aspects to speaking in a non-truthful way that disempowers actions. The exemplary task at hand, for example, may be difficult to complete so the speaker conveniently avoids the task by saying "I will try to perform" rather than "I will perform." Admittedly, this and all other non-truthful examples of verbal (or written) expression also may be the result of habit and the customary ways a given society expresses ideas. Nevertheless, the implicit expression of inaction is there, and may well undermine goal-directed behavior without the speaker's awareness. For that matter, it is the author/inventor's observation, based in 35 years of experience practicing clinical psychology, that when people are made aware of this pattern (or expressing "inaction" in their day to day communications), they understand and acknowledge it. Yet in a span of several days, they regress back into their familiar, comfortable and habitual way of speaking, which is (at times) inaccurate or otherwise untruthful. This pattern is observed for all types of non-truthful speaking described below. One main purpose of the invention is to create a tool (smart phone or other electronic communications device app) that the person can be prompted on continuously in everyday life so as to generalize the implementation of the behavior of speaking truthfully.

SUMMARY OF THE INVENTION

The inventive method, software application program, system and/or communication device that implements the method overcomes the shortcomings of the known arts, such as those mentioned.

In an embodiment, the inventive truthful speaking method, embodying the software application program, and device within which same is operational, provides users with continuous and immediate feedback to their written and/or spoken word, the feedback comprising suggested corrections when the truthful speaking software application program determines the users are not communicating "truthfully," to modify the communication to more clearly accurately convey the intended message or communication, and, perhaps as importantly, to train the users in truthful speaking to the extent that they can use what they have learned through their use of software, effectively, without the software in their future communications. As used herein, truthful speaking as a descriptor to the inventive method, software application program, system and/or device in which the inventive method is operational, but also may be used in a sense of the phrase's plain meaning, i.e., that truthful speaking is truthful communication.

An invalidation of self and others also is perpetuated by a non-truthful speaking or writing style. Turning back to the example first introduced above, calling another or oneself an alcoholic is to imply that there is nothing to the thus-labeled person other than their condition. To say "I am angry" is to declare that one is nothing more than an intense emotion, even for a short period of time. The truthful approach embodying the inventive method and system teaches people, by modifying their language (written or verbal), that each is more than their thoughts, feelings, or even their physical body. These thoughts, feelings or physical conditions are what they have, not who they are. Saying "I have the condition of alcoholism" or "I am experiencing feelings of anger" typically results in the person stepping back from the label or emotion and gaining a better perspective of not being controlled by it (the anger or alcoholism). Again, this communication style (verbal or written) is habitual, outside of a person's awareness, and resistant to change, but can be modified by use of the invention.

The philosophical core of invalidation of self and others relates to the Gestalt concept of Figure and Ground (reference provided below) We are always perceiving the world in terms of objects, and these objects necessarily must always have a background behind them, even if it is a background of nothingness. Running a movie projector in an open field at night without a movie screen produces no images. The screen does not create the images and at the same time is the context in which the movie shows up on, Similar psychological and philosophical theories discuss the critical role of space bringing things forth. For example, objects in a room such as furniture and books cannot exist without the space that the room provides. If the inside of the room was filled with cement, the furniture or books could not exist. In this way, there is an experiential shift when the person utilizes the app from perceiving oneself as a set of objects such as the person's body, thoughts, feelings, memories, etc. and as an observer of these objects. The screen accepts the images from the projector and thus provides the space for it to exist. Likewise, there is a space necessary between the observer and the observed. The above theories go one step further by suggesting that the essence of the person is that space, and is referred to as "self as context" (Hayes, supra, 2005)

The essence of invalidation of self, based on the above is related in a metaphor of a person in a dark movie theatre seeing a film, and being there for so long that they now experience the movie as their own personal reality. They now become a character of the movie, and will remain stuck in their seat forever, having no control over the outcome of their own lives. If someone comes along and turns on the theatre lights, even for a minute, the person has the opportunity to see that they are a separate aspect from the movie, and can get up, go home, and be in control of their actions.

The 10 Truthful Speaking mechanisms are designed to do just that; guide people into the awareness and experience that they are not their thoughts and beliefs. They are not the scripted movie. The Truthful Speaking mobile app periodically turns the lights on for the user when they again out of habit resume the role of sitting in a dark movie theatre.

Through use of the inventive method/device, a lack of awareness of non-truthful speaking styles, which are perpetuated by habitual thoughts, are addressed using one or more of preferably ten mechanisms. Four of the ten mechanisms are designed to insert phrases into a written text or verbal communication comprising a user's part in a cell phone conversation, that enhances the user's ability to distance themselves from their thoughts. In the remaining six mechanisms, non-truthful words or phrases are identified and replaced by truthful ones, and the user is educated as to why the modified text or verbal communication should be changed.

6 Core Principles and 10 Mechanisms

"Truth" or "truthful" is defined as that which is substantially infinitely with no modification, whole and complete; concomitantly, "non-truthful" is that which is only a fragment of all the facts. For example, for a person to say that they are a doctor is not truthful, as there are many other aspects to who the person is, such as a parent, a friend, a golfer, etc.

The goal of the inventive "Truthful Speaking" method, application program and system that implements same, is to empower all valued goal-directed actions and redefine relationships between one's validated self as discussed above and the self's thoughts and feelings, as well as one's validated self and the experienced self of everyone around them. The Truthful Speaking method, application program and system that implements same empower acts and redefine relationships by making subtle changes in spoken or written language by use of a plurality of mechanisms, for example, 10 mechanisms, in the exemplary embodiments described herein below, while keeping the user's basic message the same. The present invention specifically wants to stay away from any mention of clinical applications made by this app (see below).

The foundations of the mechanisms for this application originated from respected, well established, schools of clinical psychology. They, in turn, derive their core principles from the wisdom of Buddhism, with the Heart Sutra (Goddard, 1994) as an example of separation of objects from context as a space devoid of language-based concepts. It is emphasized here that the two Truthful Speaking applications submitted here are not claimed to be psychotherapeutic in any way at present. This is related to the consideration that no empirical psychological evidence now exists that shows the Truthful Speaking App to be effective in treating clinical psychological disorders. Instead, they are loosely termed "self-help" applications for enhancing productivity and interpersonal relationships. The inventor confidentially and experimentally developed and utilized some aspects of non-electronic Truthful Speaking acceptance based therapy techniques, guided by theoretical concepts, in private clinical practice in individual settings for over twenty years. To his knowledge, no other clinicians integrated all ten mechanisms simultaneously in a conversation generally, and in combination within single sentences. Instead, one or two were employed piecemeal. What was observed when used in combination, and in multiple sessions was an enhanced therapeutic outcome in the sessions themselves. Generalization outside the session resulted in a poor outcome. Written instructions on use of the mechanisms in everyday life proved too cumbersome and difficult for clients to use. One of the main purposes of the applications of the present invention is to succeed in generalizing and maintaining Truthful Speaking continuously in a person's everyday life through electronic technology and the continuous feedback and instruction it provides. The user options, of frequency of use of each mechanism, and diverse vocabulary of the output of word phrase pools, makes speaking easier for the user, and results in a spontaneous and natural style of conversation. It is hoped that these applications will also make it easier for many psychotherapists to use with their clients and that ultimately research studies will demonstrate clinical efficacy.

One or more of the ten Truthful Speaking mechanisms derive from or are otherwise related to principals of several acceptance-based cognitive behavior therapies, such as Acceptance and Commitment Therapy (ACT), Hayes, 2005, 2006) Gestalt Therapy, (Pearls, 1969, Fagan, 1970) and Mindfulness (Kabat-Zinn, 1994). These therapies are recognized to help people with a variety of clinical disorders, as well as those seeking personal growth; the therapies are validated extensively in studies published by numerous respected peer reviewed psychology journals. The inventive method, software application program, and system and/or device operating same is designed in an effort to effect results similar to what might be realized in a person who has undertaken treatment under one or more of these therapies in a non-clinical, self-help context.

Acceptance and Commitment Therapy, i.e., "ACT", for example, relies on six core principles, identifying where individuals are stuck and how to move past that. The six ACT core principles, which are explained in greater detail below, are:

1. EXPERIENTIAL AVOIDANCE/ACCEPTANCE relates to painful or negative thoughts feelings and actions producing them; Mechanisms related to this core principle are M4, M5 and M6 have some basis in this ACT core principal.
2. COGNITIVE FUSION/COGNITIVE DEFUSION relates to the fact that many people perceive thinking and "the way the world is" as one and the same, where thoughts are seen as literal not conceptual. Mechanisms D1 D2, D3, M7, and M8 have some basis in this ACT core principal.
3. MINDLESSNESS/MINDFULNESS. The value of experiencing the present moment (i.e. "NOW") compared with a mental conceptualized construct of time in the past and future. Mechanism M9 is the primary mechanism that addresses this ACT core principal. D1, D2 and D3 also contribute.
4. ATTACHMENT TO A FRAGMENTED CONCEPTUALIZED SELF/EMBRACING A UNIVERSAL SENSE OF SELF. We are an observer of our thoughts and feelings and a direct source of our actions (self as context) instead of a conglomerate of thoughts feelings and actions centered in a body. Mechanisms D1, D2, D3, and M8 contribute to this ACT core principal.
5. UNDEFINED VALUES/CLEARLY DEFINED VALUES. Values are considered to be chosen life directions. The source of this choice is the Whole Self, True Self, or Self as Context, not the Fragmented Self. Stated another way, the essence of the person, not their thoughts and feelings, directly determine the paths a person chooses to take. Undefined values arise from an experienced conceptualized sense of self, while clear values spontaneously arise when a person embraces them from a contextual experience of it. Mechanisms related to this core principle are D1, D2, D3, and M7.
6. INACTION/COMMITTED ACTION. Commitment is defined as a declaration of action, with the "Self as Context" being the source of the declared actions, guided by, not caused by thoughts and feelings. Commitments involve highly defined actions in a time frame so that there can be no question as to whether or not the commitment was met. This is in contrast to a "plan", which is vague and undefined. For example, "I will lose 5 lbs. in the next two weeks" is more specific than "I'll lose some weight soon." Mechanisms related to this core principle are M10, which is the actual mechanism of "Commitment", supported by M7, M4, M5, and M6.

1. Experiential Avoidance/Acceptance

The first ACT core principle involves guiding people to see that they are engaged in saying things in everyday conversation, or to themselves, in a style that leads them to avoid or escape from an emotionally painful situation. For example, someone who fears public speaking will generate reasons for avoiding such engagements. They may say to themselves or others "I try real hard to do a speech and I just get too nervous;" "I don't think I'm a competent speaker." They then do not engage in that public speaking activity. The underlying thought is that they cannot do the action until their emotion (fear) and their belief disappears (e.g., they think: "I cannot do this until my fear goes away and I gain more competence"). The function of this conclusion is to decrease the uncomfortable feelings of speaking publicly, and so the avoidance is reinforced. Counseling in an acceptance-based approach encourages the person to be willing to have the negative thoughts and feelings and to nevertheless undertake the behavior regardless. When this observed thought is embraced by this person, along with its associated negative feelings, the person is no longer expending energy on controlling their thoughts and feelings, and instead focuses on adaptive behaviors, such as making speeches.

The basic message underlying this ACT core principle is that it is possible to think and feel one way, and act another way. A corollary is that life does not care what you think and feel, it only responds to what you do.

2. Cognitive Fusion/Cognitive Diffusion

Cognitive fusion is a person's experiential state where there is no discrimination or separation between the person and their thoughts, as well as between the person's thoughts and external reality. Human language creates artificial relationships between ourselves, objects and events, which can lead to inaction as well as pain and suffering. For example, years ago people were fused to the belief that the Earth was flat and had an edge, resulting in a lack of exploration for new lands. A person believing that if they have wicked thoughts they will burn in hell can result in much emotional pain.

Cognitive defusion, on the other hand, gradually increases levels of experiential detachment from a person's thoughts, emotions and a limited sense of "Self", created by their beliefs. When a person is treated to effect "cognitive defusion", people are less controlled by their thoughts and instead experience their thoughts as opinions, which may or may not be true. When this happens they are more likely to explore new behaviors. For example, if someone believes that planes are unsafe, they are unlikely to use them. When instead someone states "I'm observing the thought that planes are unsafe," they become more open to question that thought and to see it in a new light. In the first sentence they are experientially fused with the sentence. There is no separation between them and the belief. The belief is experienced as reality. It is as though they are the belief. This attachment to thoughts is pervasive, especially when people have the belief that they are only the sum of their thoughts, and perhaps the addition of their feelings and physical body. In a way, their entire identity is based on a set of beliefs.

When utilizing the inventive Truthful Speaking method, software application program, system and/or communication device that implements the method, a defusion between the person and their thoughts is intended to occur. That is, after utilizing the invention, a person, if they are paying attention and wish to move past the aforementioned shortcomings, appears more to be on the outside looking at the thought rather than on the inside being manipulated by it. What the invention does in this sense, inter alia, is realize a cognitive defusion that might otherwise require months or years of therapy.

A second issue relating to cognitive defusion concerns a false belief that thoughts are facts that are fused with the individual. There is the belief that we have sustained control over our thoughts. This is best underscored by the common term "I think." In an ACT therapy session, clients are usually challenged by the argument: "So if it's you thinking, then stop thinking!" If you cannot for more than a few seconds, perhaps it's not you that's doing it. If you are in control of your thoughts, see if you can predict what thoughts will show up for you ten minutes from now." Stated another way, maybe your brain has a mind of its own.

The possibility of our brain thinking on its own, independent from us, brings up an interesting dilemma. The brain is in the position of telling us that it is us. There is no separation between the true nature of who we are, and our brain. It may well be that we do not control our brain; our brain controls us. Thinking occurs in the domain of language. All thoughts are comprised of words, and language also is comprised of words. Language generates an elaborate story of what the universe is and who we are in relation to it. If we ask the 7 billion people on this planet about an arbitrary topic such as the existence of a higher power and what it might be like, we will obtain an equal number of narratives. Which person is correct concerning that question? While there are many stories, one thing remains constant, every story is composed of language.

So if we are not in control of our thoughts, our language and our stories, then our entire perspective on what life becomes false. We do not experience and create our subjective world, our brain through language and story does it for us. It tells us who we are. We do not get to see or experience it objectively. For that matter, these possibilities may upset people also may be "freeing." When seeing how the brain has been controlling us our whole lives, we are in the position to take a backward step so as to separate and defuse the essence of who we are from our brain, and the thoughts, stories and language our brains create on its own. It is emphasized now that this entire narrative on what "Truth" is or is not, is also a product of language and can be questioned by observing the narrative rather than being or believing it. The first thing an ACT therapist tells their clients is "don't believe anything I am going to tell you."

Perhaps the word most associated with cognitive fusion is the word "because." It creates arbitrary and untruthful narratives of causality. To say that the team won "because the quarterback was healthy", again is untrue. Many players were involved in the game. A truthful statement would encompass all the variables in winning the game, which are near infinite. The brain does not do this naturally—it must be trained to do so.

So defusing language occurs by guiding the person into constantly seeing and experiencing that their language is just a story and not necessarily a factual reality. Another word for defusion that encapsulates this construct is "distancing." An experiential distance is created between the person experiencing the thought and the thought itself.

3. Living In The Past And Future/Being In The Now

Cognitive fusion, as described above, can lead to many types of dysfunction. One area involves ruminating on the past and fearing the future. For example, a person may look into the past with regret and be paralyzed by perceived failures. Likewise, a person can create a great deal of anxiety by anticipating negative outcomes in the future. Only the "now" is truly present in every moment of the person's existence. In ACT therapy, the person is encouraged to defuse arbitrary interpretations of time. Truthfully, the past or future do not exist, except as mental constructs. That does not mean that the past and future with their associated thoughts and feelings does not exist. Instead, the person is directed to experience the past and future directly in the present moment. One cannot be harmed in the present by things that have occurred in the past or will occur in the future. The person is encouraged to accept things in the present moment and make responsible choices. The inventive method, software application program, and system and/or device operating same is designed in an effort to effect results similar to what might be realized in a person who has undertaken treatment to loosen a grip that cognitive fusion might have a user.

4. Attachment to a Fragmented Conceptualized Self/Embracing a Universal Sense of Self Living in an experiential reality where the person is fused to their thoughts and feelings produces a number of consequences that takes away from a person's quality of living. Like a fish who has spent his whole life in water, he is oblivious to the very existence of water. The only way to give it an awareness of water is to take him out of it briefly. This is like the defusion/distancing construct presented above. Here, the stakes are higher. The inventive method, software application program, and system and/or device operating same, is designed so that when used by a person over time, should enable the user to separate out more than one thought or feeling from another. That is, the invention when used will separate the true essence of the person from the thoughts and feelings that declare unquestioningly who that person is. When done so, the person is more open to taking healthy actions that they would not have otherwise.

When most people are asked who they are, they typically reply by pointing to a part of their body like their head or their heart, or by stating a work or social role that they have. But these are only fragmented half-truths. In ACT, for example, the topic of identity is a contextual one, where the context is defined as that which holds one or more contents. For example, in a bowl that holds fruit, the fruit are the contents and the bowl is the context. In the case of a person, their thoughts, feelings and actions are what they have, and they as an observer of their thoughts and feelings is the essence of who they are. ACT goes further in exploring with people their essence. In the example above, while a bowl is a context for the fruit, the bowl with fruit is a content for the room it is in. At the same time, the room is also a content for the building as its context. We can take this line of thinking many more steps until we finally reach a point where there is a context of infinite size that holds everything. Regarding the individual, their thoughts, feelings, roles, body, memories etc., all are contents; possessions that the person has, not in any way who they are. They, in turn are the observer, the context, that which holds all of these things. This infinite context discussed above is who the person truly is. Over a lifetime many of these contents change, while the person is still who they are.

Because the person is observing outside their own thoughts and feelings via the defusion training described above, they are doing so outside of the mental constructs of space and time. In this way, the self is experienced as timeless, selfless and infinite. From this experiential perspective the last two core principles evolve. The inventive method, software application program, and system and/or device operating same is designed in an effort to effect results similar to what might be realized in a person who has undertaken diffusion training treatment.

5. Undefined Values/Clearly Defined Values

Values are clearly defined directions a person expresses to move into in a variety of life areas. Values are not wants or needs. Instead, values are reflected in behaviors that declare where the person is looking to grow. It is typically observed that when individuals enter the experiential space of "Self" as context, their values change dramatically. A frequent outcome is that people become aware that the essence of others is the same as their own. They wish to move into areas of life that enhance communication and altruism with other human beings. Another shift is that the person's experience of choice is now perceived fully, as opposed to the reactions to thoughts and feelings that were made automatically for them. From the sense of values, a foundation for a last core mechanism, commitment, is relied upon and utilized by the invention.

6. Inaction/Committed Action.

A commitment is a declaration of action whose source is the person experienced as "Universal Self", and not the result of their thoughts and feelings. The latter may guide the creation and keeping of a commitment and at the same time never takes a causal role in it. ACT is considered an acceptance-based form of behavior therapy. As such, only behaviors (not thoughts and feelings), are focused on for effecting a behavioral change in the person, i.e., once positive actions occur, positive thoughts and feelings follow.

Once a value direction is identified, the person can choose to declare an action. Commitments are not plans. Instead they are declarations specific as to the type of behavior and the time frame. They are short-term, giving the person opportunity to modify the actions as needed. Commitments guide a person's behavior into positive actions. Positive actions improve the quality of a person's life not through changing thoughts and feelings, only through actions taken by the Universal self. The inventive method, software application program, and system and/or device operating same is designed in an effort to effect results similar to what might be realized in a person who has undertaken an acceptance-based form of behavior therapy.

In various embodiments, the present invention, e.g., the Truthful Speaking method, is a computer-based method of processing writings including email communications, text-based or verbal communications, which, based on the processing, makes alterations, substantially minor, in the writings, text-based or verbal communications to enhance the "truthfulness" or definiteness of the words in order to literally convey the exact context to be communicated.

The Truthful Speaking method is a software system or application program embodying computer readable instructions that are processed by a processor in a user's smart phone or electronics communications device, such as a computer (e.g., a personal computer), within which the software is installed and operational, to analyze the user's speaking or writing by use of his/her smart phone or computer. The invention is not limited to but cooperates with the protocol of any email system, texting/short messaging system, generic communications or word processing systems, to modify word processing documents, presentations, memos, messages, text messages, etc. (without limitation), and modifies certain parts of the communications found therein, for example, the written or spoken language. The invention also includes a truthful speaking computer system or device in which the inventive software application program is present and operational and a non-transitory computer readable medium in which the instructions comprising the method are stored.

There may be many versions and variations of the inventive method, two of which are explained herein for exemplary purposes. The first, referred to herein after as the "Fully Automated Truthful Speaking" application program, converts inputted text into whole sentences for the user. Whole sentences also are generated when empowering phrases are randomly inserted by this fully automated application program. The second version of the inventive method is referred to herein as a "User Mediated Truthful Speaking" application program, identifies non-truthful words and phrases and gives the user suggested word or phrase replacements, regardless of the communications medium. The user then takes these suggestions from selected word phrase pools and creates an appropriate sentence that is now truthful.

The mechanisms, as mentioned and described above, operate to modify the written language using a plurality (for example, 12, word/phrase pools), which are stored. And while the modified language is advantageous vis-à-vis the communication itself, the inventive method also is advantageous in that user interaction with the software application program (e.g., viewing and recognizing the textual changes implemented by the software to his/her writing), effects a positive change in the user's writing and communication skills in the long term. Such positive change enhances communication skills and empowers actions to those who choose to utilize and observe the method's effect on their verbal or written communications. The invention may very well effect particular changes to the user's writing and communication style (or lack thereof).

In greater detail, when users operate the inventive method in the background of the computerized writing and/or communication tools, its use improves the user's ability to be more objective about what they are thinking and feeling, by observing the textual modifications, over time. In a sense, the invention exposes the users, and preferably provides the users, with a healthier perspective on their relationship to themselves and others. The invention transcends barriers to accomplishing life's goals through the act of commitment, acting as a self-help tool for people to use on an ongoing basis for communicating with others and reflecting on their own experiences.

Once operational in a user's computer or smart phone, both the "Fully Automated" and "User-Mediated" versions of the software application program, the logistical task implemented thereby is straightforward. A sentence is typed or verbally articulated by the user and processed, where the processing causes a verbal output in the form of verbal instructions to the user associated with the typed data. The verbal instructions or output is a function of guidelines or rules embodying specific mechanisms or rules (for example, 10 mechanisms, which open in association with the preferably 16 word/phrase pools (which supplement and diversify vocabulary), in the preferred embodiment.

Using the inventive method, which includes a reliance upon the 10 mechanisms, alter a user's language (in a communication) in a way that allows the user to distance himself/herself themselves from their thoughts and emotions, fully experience contradicting thoughts and feelings, question the causes of their decisions, experience living in the present moment and empower healthy actions by disempowering words, phrases, thoughts and feelings that interfere in keeping commitments and achieving goals. Ideally, when people text for 20-30 minute sittings, feelings of increased awareness and thoughts of focused goal-directed action will emerge, based on the feedback provided by the inventive method.

In a configuration step, the user pre-programs how often in a texted conversation each mechanism will be utilized. Most mechanisms have pools of alternate words that are substituted for the original element in a sentence (i.e., the word/phrase pools). The user specifies how frequently these words are used during program operation, or may creatively type in their own variant. The above options allow the output to be natural and stylized for each individual, as opposed to being rigid, redundant, mechanistic and boring. Several mechanisms are employed simultaneously for a given sentence when appropriate.

In an embodiment, the invention includes a method for processing an original user writing, implemented by a computer processor, to modify relationships between words, phrases, signs and symbols comprising the writing, where necessary, to generate a modified writing that more clearly conveys a semantic content intended by the user when compared to the original user writing, or guided by the theoretical underpinnings of the 10 mechanisms outlined herein. The method includes steps of receiving an original writing from a user, processing to perform a linguistic analysis on the original user writing in accordance with a plurality of rules to identify semantic content, and, based on the processing, and the semantic content, altering the relationships between the words, phrases, signs and symbols within the writing, where necessary, to realize a modified writing reflecting the altered relations.

The step of altering the relationships includes generating a description highlighting a difference between a connotation of the altered words, phrases, signs and symbols altered before and after alteration, Preferably, generating the description includes communicating a semantic rule. The method can also include a step of communicating the modified writing to a receiver and preferably, communicating the reason for making the necessary changes made to the original user writing and included in the modified writing to a receiver. The step of processing can include implementing at least one of a plurality of mechanisms, wherein the plurality of mechanisms operate in reliance upon a plurality of word-phrase pools. Preferably, the plurality of mechanisms includes 10 mechanisms. In one form, the word-phrase pools operate to supplement and diversify vocabulary including in the modified writing. The method also includes a step of configuring the pre-programming the processing to define how often each mechanism is utilized is step of processing.

In another embodiment, the invention includes computer program product comprising program code means embodied in a non-transitory computer readable, which upon processing by a computer or controller, executes a method for processing an original user writing to modify relationships between words, phrases, signs and symbols comprising the writing, where necessary, to generate a modified writing or verbal communication to the user that more clearly conveys a semantic content intended by the user, or consistent with the philosophy of the 10 mechanisms, when compared to the original user writing, as described above.

In another embodiment, the invention includes a computer system programmed to process an original user writing to modify relationships between words, phrases, signs and symbols comprising the original user writing, where necessary, to generate a modified writing or verbal instructions that are generated and communicated to the user (for example, by a speech recognition and speech generation program or plug-in operating concurrently with the inventive method and system), that more clearly conveys a semantic content intended by the user, or consistent with the core principles associated with the 10 mechanisms, when compared to the original user writing or verbal communication articulated by the user. In an embodiment of speech recognition, because the correction input comprises of only 20 or so words, no formal speech recognition software is required. Instead, a simple sound recognition program can be utilized to identify the sounds these words make. This results in a simple and inexpensive method of developing a native software for the purpose of the application. The limited scope of all the word-phrase pools also permits rapid and inexpensive application to all other languages, with no required change in app programming. One simply changes the contents of the word-phrase pools into another language utilizing the appropriate words and phrases consistent with Truthful Speaking that more clearly conveys a semantic content intended by the user, or consistent with the core principles associated with the 10 mechanisms, when compared to the original user writing or verbal communication articulated by the user.

An exemplary computer system should comprise a computer processor, a memory for storing a plurality of preconfigured modules embodying the inventive software application program and any cooperating application program (e.g., speech recognition/generation program) and an I/O device for inputting an original writing or verbal communication from a user and for outputting a modified writing, or a verbal communication directed to the user, which may be relied upon to modify the text or verbal communication before it is sent to a recipient. The computer processor controls a rules module to perform a linguistic analysis on the original user writing received at the I/O unit in accordance with a plurality of rules to identify semantic inconsistencies in the relationships between the words, phrases, signs and symbols comprising the original user writing or verbal communication and upon finding semantic inconsistencies, the computer processor controls the rules module to generate the modified writing and/or cooperates with the speech recognition and generation program to articulate instructions to the user to modify his/her articulated spoken communication.

The computer processor also generates a map of the differences between the original writing (or spoken communication) and the modified writing (or spoken communication) and, generates an explanation of the differences between the original writing (or spoken communication) and the modified writing (or spoken communication). The computer processor also generates an explanation of the differences between the original writing (or spoken communication) and the modified writing (or spoken communication), where the map includes a listing of semantic rules used. The I/O device sends the modified writing map to the user, and if configured to do so, to an intended recipient, wherein the rules module includes a plurality of memory-stored mechanisms. The memory-stored mechanisms operate in reliance upon a plurality of word-phrase pools and, the word-phrase pools operate to supplement and diversify vocabulary including in the modified writing.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

Figure 1:
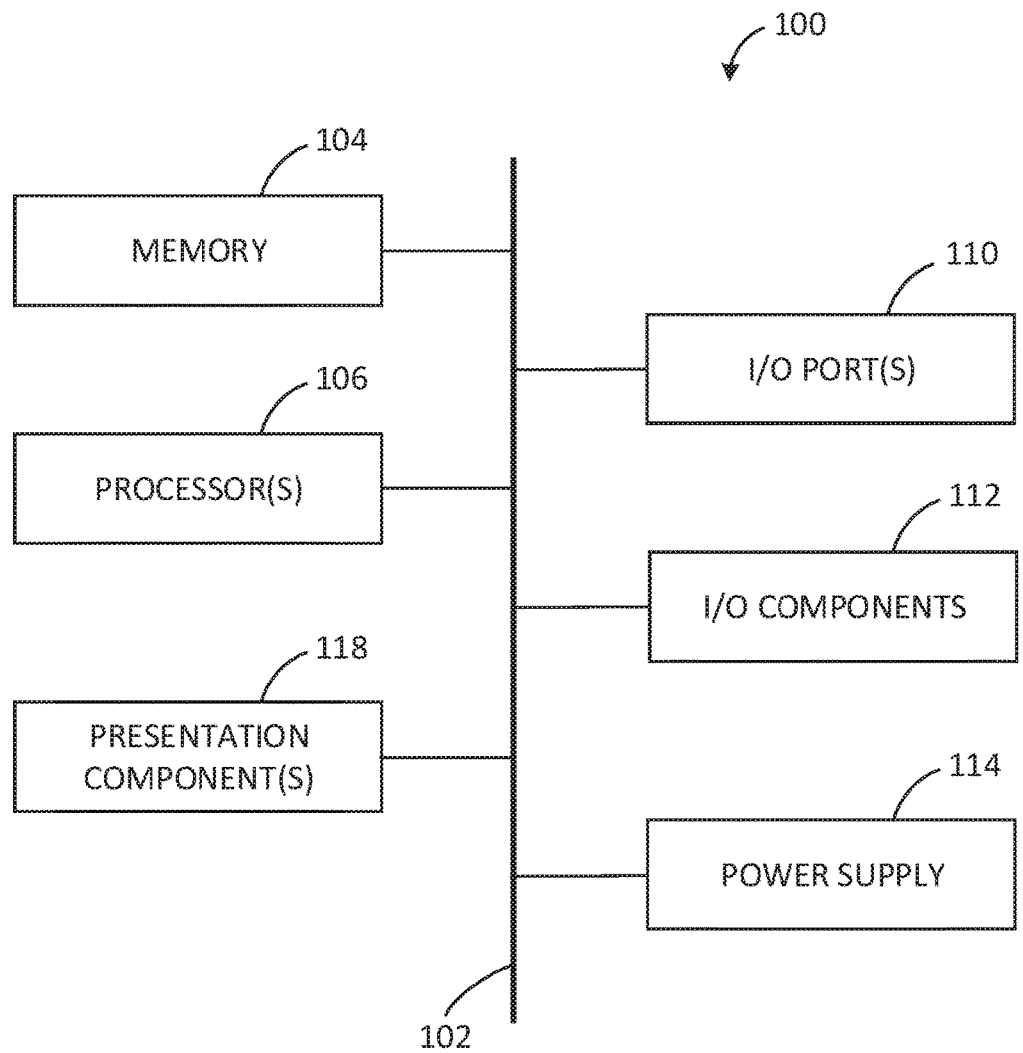
FIG. 1 is a block diagram showing an exemplary computing device in accordance with certain embodiments of the invention.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

In one embodiment, the invention provides a method for modifying communications, for example, written, between a user and the outside world, or verbal via a smart phone using texting, emailing or calling and speaking to any user with an electronic device capable of receiving a written, textual, electronic or spoken communication, which modification communicates to the user how to improve his/her writing and/or verbal communication skills. To do so, the inventive method for modifying communications provides or implements a plurality of mechanisms that facilitate truthful speaking in the communication operated upon by focusing the user's attention on the modifications made.

To make the truthful speaking method, system and/or device less artificial and more natural, each one of the plurality of mechanisms is adjustable to appear more or less often in the modified text. The frequency can vary from 0 to 100%, e.g., a user may program 50% for the disqualifiers mechanism. As a result this "50%" programming, on average, every second time the word "but" is detected in the written text, the disqualifiers mechanism substitutes the word "and" for "but." The user may choose to vary the frequency for all of the plurality of mechanisms independent of each other, which results in a multidimensional complexity, since there are a huge number of combinations of the 10 mechanisms to be applied independent of each other. Put another way, the user, by trial and error, can discover the best fit for his or her self concerning how the truthful language is expressed during use. Furthermore, different frequency combinations are used for different settings the mechanisms employ. Social texting may sound and feel better in one mechanism combination, while business writing may be preferred using another combination.

In particular embodiments, the inventive truthful speaking method is intended to operate on a conventional smart phone as an application program. The application program embodies software instructions that are memory stored and processed by the smart phone's processor. When text or voice communication data are entered into the smart phone, the method, which is essentially running in the background, processes the data in accordance with the adjusted frequency of the mechanisms and responds with the feedback.

Put another way, the invention operates in the general context of computer software code or machine-useable instructions, including computer-executable instructions such as program modules. These instructions are executed by a processor in a computer or another machine, in particular, a smart phone. The program modules include protocols, routines, programs, objects, components, data structures, etc., and refer to code that performs particular tasks or otherwise operates on data types. The inventive systems and methods described herein may be practiced on a variety of system configurations, including hand-held devices, consumer electronics, general-purpose computers, specialty computing devices, and other similar devices, in particular cellular phones such as Smart phones that have texting and email capabilities, and an ability to receive and operate downloaded software application programs. The inventive concepts may also be practiced in networked environments, including distributed computing environments where tasks are performed by remote-processing devices that are linked through a communications network.

For example, the electronic communications device is selected from the group consisting of a smart phone, a tablet, a desktop computer, a laptop computer, a smart watch or any current or future device capable of receiving and processing verbal or textual material.

Computer-readable media include both volatile and non-volatile (non-transitory) media, removable and non-removable media, and contemplates media readable by a database, switch, and various other network devices. By way of example, computer-readable media includes, but is by no means limited to, media implemented in any method or technology for storing information. Exemplary stored information includes computer-useable instructions, data structures, program modules, and a variety of other data formats. Media examples include, but are not limited to, information-delivery media, RAM, ROM, EEPROM, flash memory or other memory technology, compact discs (CD), digital versatile discs (DVD), optical discs, magnetic tapes, magnetic disks as well as other magnetic storage devices. These technologies may store data momentarily, temporarily, or permanently.

FIG. 1 displays a representation of an exemplary operating environment for implementing embodiments of the invention in the form of computing device 100. Computing device 100 is exemplary of a suitable computing environment and is not intended to and should not be read to suggest any limitation as to the scope of use or functionality of the invention. For example, in some embodiments, it is preferred that the computing device comprises a smart phone including an input device such as a speaker for receiving voice input, an A/D converter for converting the analog voice data to digital voice data, and a voice recognition plug-in for turning the digital voice data to text that is processed by the inventive method.

Computing device 100 includes a bus 102 that directly or indirectly couples the following components: memory 104, one or more processors 106, one or more presentation components 108, input/output ports 110, input/output components 112, and a power supply 114. Bus 102 may be one or more busses (such as an address bus, data bus, or combination thereof). As one of skill in the art would appreciate, the various components shown in FIG. 1 may be merged and combined. For instance, a display device might serve as both an I/O component and a presentation component. Similarly, processors have memory. Thus, it is to be understood that FIG. 1 is merely illustrative of an exemplary computing device that can be used in connection with one or more embodiments of the invention. All categories of computing devices such as a "workstation," "server," "laptop," "hand-held device," "smart phone," etc., are contemplated and within the scope of FIG. 1 and referenced herein as a "computing device."

Memory 104 includes computer-storage media in the form of volatile as well as nonvolatile (non-transitory) memory. This memory may be removable or non-removable or a combination thereof. Exemplary hardware devices may include solid-state memory, hard drives, optical-disc drives, etc. Computing device 100 includes one or a plurality of processors 106 that read data from components such as memory 104 or I/O components 112, voice data from a voice recognition program. Presentation component(s) 108 present indications of data to a user or another device. Exemplary presentation components 108 include visual display devices, speakers, printers, microphones, etc. I/O ports 110 allow computing device 100 to be coupled with and in communication with other devices including other I/O components 112, which may be part of the computing device 100 itself. Illustrative I/O components 112 may include microphones, trackballs, scanners, cameras, printers, keyboards, touch sensitive devices, including touch sensitive screens, other interactive display devices, or a mouse.

In one embodiment, for example, the inventive method processes an original user writing, or an original user voice communication, using a computer processor in any of the devices mentioned (i.e., the smart phone), to modify relationships between words, phrases, signs and symbols comprising the writing or spoken text, where necessary, to generate a modified writing or a voice message to the user in response to his/her spoken communication, that more clearly conveys a semantic content intended by the user, or guided by the inventive Truthful Speaking principles, when compared to the original user writing or spoken communication. The processing includes performing a linguistic analysis on the original user writing or verbal communication in accordance with a plurality of rules to identify semantic content, and, based on the processing, and the semantic content, altering the relationships between the words, phrases, signs and symbols within the writing, or advising the speaker on how to improve his/her spoken communications, where necessary, to realize a modified writing reflecting the altered relations.

The original user writing may be generated using a smart phone in which the software application program implementing the method is operational. When communicating verbally, a user merely speaks into the smart phone. Alternatively, the original user writing may have downloaded to the smart phone in which the inventive method and application program is operational. In that case, the software application program includes an application program interface that monitors and cooperates with any "written word" generating applications, or spoken-word communication applications, to access the original user writings or verbal communications.

The step of altering the relationships includes generating a description highlighting a difference between a connotation of the altered words, phrases, signs and symbols altered before and after alteration. Preferably, generating the description includes communicating a semantic rule to the reader or in the case where the communication is a computer-generated verbal articulation, the hearer. The method also can include a step of communicating an advisory as to the reasons the user should modify his/her spoken communications, and how. The communicating may be spoken but preferably is textual, i.e., an advisory is flashed on the smart phone display. For that matter, the smart phone additionally may vibrate, generate and output a sound or a light signal to secure the verbal user's attention to an advisory in response to his/her last statement(s) during a real-time telephone conversation.

The step of processing can include implementing at least one of the plurality of mechanisms, which operate in reliance upon a plurality of word-phrase pools. Preferably, the plurality of mechanisms includes 10 mechanisms. In one form, the word-phrase pools operate to supplement and diversify vocabulary including in the modified writing or suggestions from word phrase pools for modifying a spoken communication (e.g., as a user speaks into a smart phone). The method also includes a step of configuring (pre-programming) the processing to define how often each mechanism is utilized in the step of processing.

In another embodiment, the invention includes computer program product comprising program code means embodied in a non-transitory computer readable, which upon processing by a computer, executes a method for processing an original user writing, or an original voice communication entered into a smart phone during a wireless telephone conversation, to modify relationships between words, phrases, signs and symbols comprising the writing, where necessary, to generate a modified writing that more clearly conveys a semantic content intended by the user when compared to the original user writing or verbal communication, as described above. Please note that while the embodiment described is directed to the smart phone, which is wireless, the inventive method and application program also can readily work in a voice over IP (VOIP) telephone system, where the inventive software and plug-ins operate with the VOIP.

Figure 2:
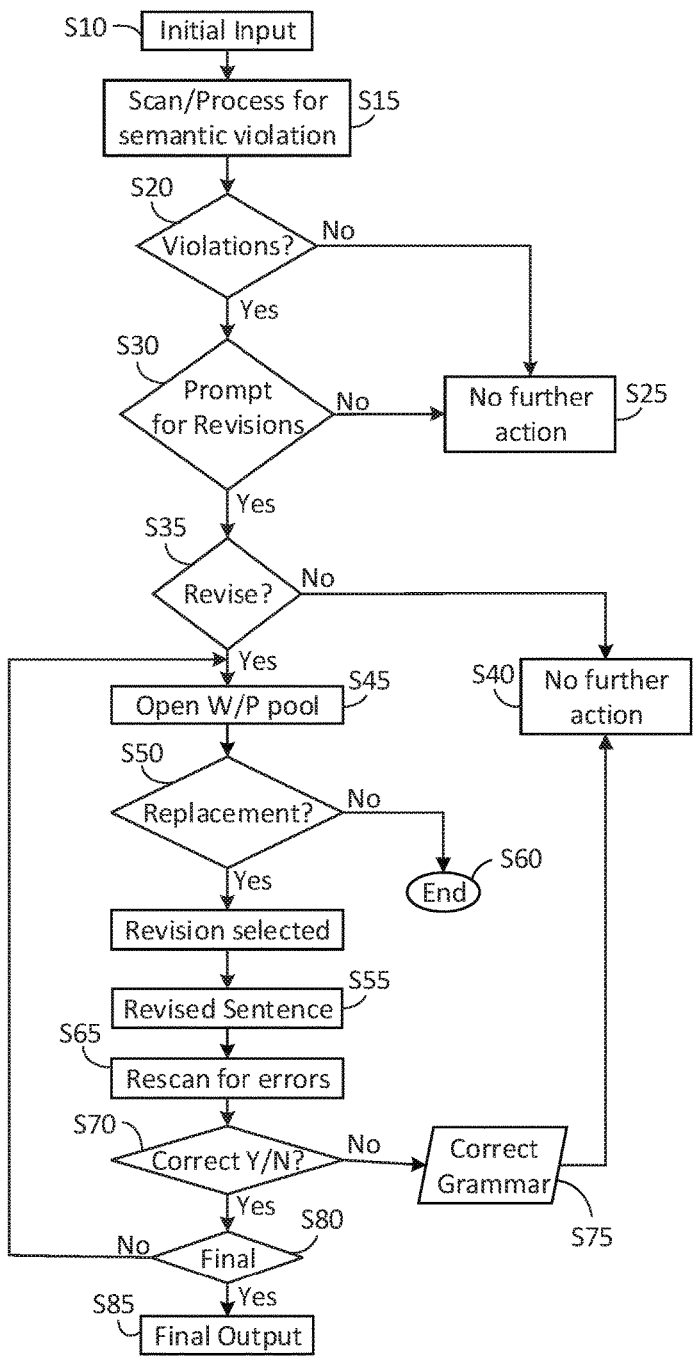
FIG. 2 is program flow diagram depicting one method embodiment of the written word refinement system of the invention.

The FIG. 2 flow chart presents another embodiment of the inventive method. There, block s10 represents a step of initiating input in a form of receiving an original user writing via an I/O device or via an API to the application program. Then, a step of scanning or processing the original user writing is implemented, as indicated or represented by block S15. If semantic violations are not found (block S20), no action is taken, as represented by block S25. If semantic violations are found, the writing is paired with corresponding mechanisms (as represented by block S30) and then, further processing occurs including opening corresponding word/phrase pools, as represented by block S45.

The processing then determines whether word or phrase replacements must be made, i.e., a modified writing. If yes, a modified writing is implemented (block S55) but if no, the process ends (block S60). The altered or modified writing is then re-scanned, as represented in block S65. The re-scanned writing is further processed to determine grammatical correctness, as indicted by block S70, If grammatically correct, the writing is undergoes a final edit stage (S80) and output (S85). If not grammatically correct, grammar is corrected (Block S75) until no further action is required (S40), sent to final edits block S80 and output (S85). Modifications to the method may be implemented.

Figure 3:
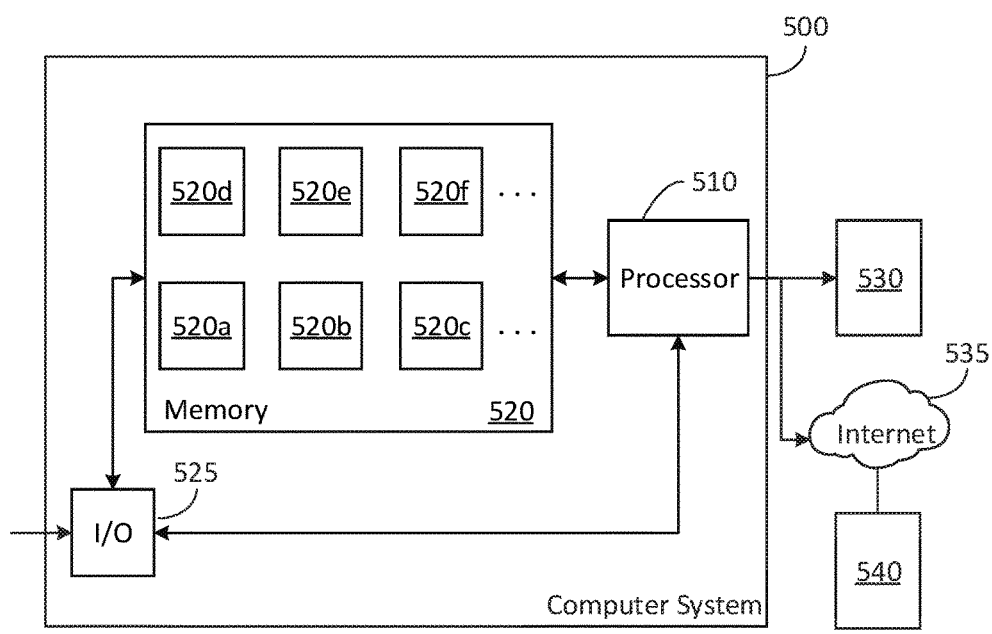
FIG. 3 is a block diagram representing a system embodiment of the written word refinement system of the invention.

In another embodiment, the invention includes a computer system 500 (FIG. 3) programmed to process an original user writing to modify relationships between words, phrases, signs and symbols comprising the original user writing, where necessary, to generate a modified writing that more clearly conveys a semantic content intended by the user, or consistent with the core principles associated with the 10 mechanisms, when compared to the original user writing. The computer system comprises a computer processor 510, a memory 520 for storing a plurality of preconfigured modules 520a, 520b, 520c, . . . and an I/O device 525 for inputting an original writing from a user and for outputting a modified writing. The computer processor controls a rules module to perform a linguistic analysis on the original user writing received at the I/O unit in accordance with a plurality of rules to identify semantic inconsistencies in the relationships between the words, phrases, signs and symbols comprising the original user writing and upon finding semantic inconsistencies, the computer processor controls the rules module to generate the modified writing.

The computer processor 510 also generates a map of the differences between the original writing and the modified writing and an explanation of the differences between the original writing and the modified writing. The map may be stored in memory 520 or may be stored in peripheral memory 530, or even memory 540 accessible through the Internet 535. The computer processor 510 also generates an explanation of the differences between the original writing and the modified writing, where the map includes a listing of semantic rules used. The I/O device sends the modified writing map to an intended recipient, wherein the rules module includes a plurality of memory-stored mechanisms. The memory-stored mechanisms operate in reliance upon the word-phrase pools, wherein the word-phrase pools operate to supplement and diversify vocabulary including in the modified writing.

In the following exemplary embodiment, the inventive method implements ten mechanisms directly related to the six ACT core principles, and concepts set forth by Gestalt Therapy and Mindfulness including:

D1 DISTANCING FACTS FROM THOUGHTS
D2 DISTANCING THOUGHTS FROM THE SELF
D3 DISTANCING THE SELF FROM THE OBSERVING SELF
M4 ELIMINATING DISQUALIFIERS
M5 ELIMINATING ARBITRARY CAUSALITY
M6 ELIMINATING SUBJECTIVE OBLIGATION
M7 ELIMINATING WORDS THAT DISEMPOWER ACTIONS
M8 DISCRIMINATING BETWEEN OURSELVES AND OUR THOUGHTS, FEELINGS AND ACTIONS
M9 KEEPING EXPERIENCES IN THE HERE AND NOW
M10 USING OBSERVER-GENERATED COMMITMENTS GUIDED BY VALUES

Values are clearly defined directions a person expresses to move into in a variety of life areas. A commitment is a declaration of action whose source is the person experienced as Universal Self, and not the result of their thoughts and feelings.

In general, of the ten aforementioned mechanisms, mechanisms D1, D2, D3 and M9 are considered to be "Insertion" mechanisms. On the other hand, mechanisms M4, M5, M6, M7 and M10 are considered to be "correction" mechanisms.

To Guide and Empower Actions

The first three mechanisms (D1, D2, D3) are designed to create experiential distance between the writer, or speaker, as the case may be, and his or her thoughts and feelings, and in the case of D3, distance between the essence of the writer or speaker as an observer of thoughts and feelings and their conceptualized sense of self. The mechanisms are first identified by number and title in the exemplary embodiment, and then explained in their own right, as well as in the way they are derived from the ACT core processes.

D1—Distancing the Facts from the Thoughts. Mechanism D1 processes a sentence such as "The Earth is flat." and converts it to a sentence such as "I think the Earth is flat." A large pool of alternate words or phrases unique to this mechanism, expressing the same principle such as "In my opinion the Earth is flat" or, "I believe the Earth is flat" Is utilized. Note that D1, D2, and D3 are mechanisms that randomly insert phrases into a conversation. They do not identify non-truthful speaking errors and replace them. In an embodiment for use with a smart phone, which operates upon a user's verbal communication, after it is processed by speech recognition software that operates with the inventive software application program (via a plug-in or API), the method recognizes the sentence, and causes the smart phone to deliver a soft vibration, sound or fight signal followed by text on the screen stating: "Start your next sentence with the phrase 'I think'" or some other variation from the D1 word-phrase pool. The user then follows the instructions.

In everyday speaking and writing, propositions (beliefs) are given as though they are facts. The inventive method modifies such sentences by declaring both the person speaking the belief and the belief itself. In so doing, a subjective experiential space is created, where the speaker and the speaker's spoken belief are felt at the same time, in the present moment, and in the now. Operation of mechanism D1 in the inventive method entails only a partial defusion of thoughts and feelings in relation to the essence of the person. To say "I think" is a step in the right direction relative to just making a blanket statement. At the same time, following Core Process 1, Acceptance, the person does not actively think or feel. Instead, the brain and body do this activity automatically. The person is simply in the role of observing these thoughts and emotions and taking a course of action guided by, and not caused by, the thoughts and feelings. It is difficult to accept that we are not in direct control of our thoughts. Nevertheless, "I think" is a good initial starting point for a mechanism for defusion. As a user becomes more experienced, D2 and later D3 can be introduced, making the experience of cognitive diffusion more pronounced.

D2—Distancing Thoughts from the Self. Mechanism D2 takes the sentence "The Earth is flat." and converts it to "I'm observing the thought that the Earth is flat" or some variation of "observing" from the mechanism's corresponding pool of alternate words and phrases. An example is "I'm contemplating the belief that the Earth is flat." In the embodiment for use with a smart phone, which operates upon a user's verbal communication after it is processed by speech recognition software that operates with the inventive software application program, the inventive method causes the smart phone to deliver a soft vibration, a sound or a light signal followed by text on the screen stating: "Start your next sentence with the phrase 'I'm observing the thought that'" or some other variation from the D2 word-phrase pool. The user then follows the instructions.

The rationale behind the mechanism D2 modifications is also directly related to ACT core process 2, Cognitive Defusion. The philosophy related to the mechanism D2 modification is that observation necessarily requires the observer to step back from that which is observed. This experiential space is the un-fusing of thought from thinker.

D3—Distancing the Self from the True Self. Mechanism D3 takes the sentence "The Earth is flat" and transforms it into "There is the observation of the thought that the Earth is flat" or some similar version from the word/phrase pool. Notice that D3 has excluded all forms of the mental constructs of "I" or "me." In the embodiment for use with a smart phone, which operates upon a user's verbal communication after it is processed by speech recognition software that operates with the inventive software application program, the inventive method causes the smart phone to deliver a soft vibration, a sound or a light signal followed by text or directive on the screen stating: "Start your next sentence with the phrase 'There's the observation of the thought that'" or some other variation from the D3 word-phrase pool. The user then follows the instructions.

As with the mechanism D2, the core process of mechanism D3 also is cognitive diffusion. Here, core process IV, Self as Context, also contributes to the mechanism, as conceptual aspects of self are removed.

The rationale behind the mechanism D3 modification derives from the conventional experience of one's identity represented in language by the word "I" to one of an observer or experiencer of thoughts feelings and actions that has no tangible basis in physical reality. The latter is often referred to as the True Self. More specifically, one's True Self is defined as the source of observation of thoughts and feelings, as well as the direct cause of speaking and doing. This perspective is at the heart of what the inventive method and system are designed to facilitate, i.e., to lead a person into experiencing and ultimately guiding into actions based on choice and free will.

In the mechanisms D1, D2 and D3, if emotions are expressed instead of thoughts, the form becomes: "I'm observing the feeling of sadness, etc.". For mechanisms D1, D2 and D3, the modified phrase will generally begin the sentence, as is the case above, and less frequently is inserted in the middle or the end of that sentence. For example, the sentences "The Earth, in my opinion, is flat" or "The Earth is flat, in my opinion" are equally acceptable. These type of variations produce the richness and multidimensionality to the language the software is creating.

It is important to emphasize that in the above and, in the remaining seven mechanisms, the essence of the message's ideas are left intact. This requirement is essential for the program's output at all times.

M4—Eliminating Disqualifiers. Mechanism 4 identifies disqualifiers such as the word "but" or "however" and substitutes it with bridge words such as "and," or some other variant, or with no word at all. In the embodiment for use with a smart phone, which operates upon a user's verbal communication after it is processed by speech recognition software that operates with the inventive software application program, the inventive method, the sentence "I love my dog but he barks too much" becomes "I love my dog and he barks too much." Or "I love my dog. He barks too much." As such the software recognizes the non-truthful word "but" or its variation from the word-phrase pool, and causes the smart phone to deliver a soft vibration, a sound or a light signal (to secure the speaker's attention) followed by text on the screen stating: Say your last sentence again with the word "and."

The rationale behind the mechanism M4 modification is that disqualifiers function to fragment rather than integrate experiences. Truth generally seeks to include all things in one's experience, not just the ones that one wishes to have or is comfortable with. In psychotherapy, words like "but" often emerge when a client is resistant. They may say "my father beat my mother all the time, but he was a wonderful man."

Disqualifiers also function in minimizing emotional discomfort by eliminating conflicting emotions. Disqualifiers can be uncomfortable and confusing to both have feelings of love and hate for a person or oneself at the same time. Having simultaneous conflicting thoughts and feelings are in the domains of truth and in the here-and-now. This possibility to be willing and able to observe and experience all of one's emotions and take responsible actions is at the heart of what the inventive method is and what inspires that the software application be named as such. The rationale behind the mechanism M4 modification is related to ACT core process I. When people choose to discuss uncomfortable conflicting thoughts and feelings simultaneously, they have left the domain of emotional avoidance and have entered into the realm of acceptance.

M5—Arbitrary Causality. Mechanism M5 addresses arbitrary causality as reflected by words and phrases such as "because" and "for that reason." These words or phrases are replaced by phrases such as "connected with" and "related to." For example, the sentence "I got into an automobile accident because I was upset at the time" is altered into "I got into an automobile accident and that was related to my being upset at the time." In the embodiment for use with a smart phone, which operates upon a user's verbal communication after it is processed by speech recognition software that operates with the inventive software application program, the inventive method recognizes the non-truthful word in the sentence, and causes the smart phone to deliver a soft vibration, a sound or a light signal to alert the speaker, which alert is followed by text on the screen stating: "Restate your previous sentence with the phrase "connected with"" or some other variation from the M5 word-phrase pool. The user then follows the instructions.

The rationale behind Mechanism M5 is illustrated in the following: If I open my hand and a pencil falls to the ground, people invariably say that it fell because of gravity. Gravity is simply a label for two objects being attracted to one another. Gravity does not identify any true cause for this attraction.

Another representative conventional example is: "The pencil fell down when I opened my hand because of gravity." A representative Truthful Speaking example is: "I'm observing the thought that the pencil falling to the ground is connected to my hand opening and there is the observation of the thought that I don't know what caused it to fall to the ground," which statement is indeed truthful. Asking scientists for the ultimate cause of any consistent pattern of two seemingly independent actions will result in reaching a point where their level of understanding is exhausted. Another way of stating this event Truthfully is: "I'm observing the thought that the pencil fell to the ground when I opened my hand because the pencil fell down when I opened my hand."

Further concerning Mechanism M5, the conventional belief is that the reasons we take all actions are the direct result of what we believe and how we feel. If a person is asked why they took a given action, the reasons given are always thoughts and feelings. The inventive method asserts that while thoughts and feelings can guide actions, they never actually come to cause them. If someone gives us advice and we take it, that person did not cause the action. Instead, the observer of beliefs and emotions looks at their own thoughts and feelings and takes a course of actions independent of them.

From this point of view, it is possible to think and feel one way and act another way. This can be liberating in that one is no longer required to change their beliefs and emotions to take actions to the contrary. Instead, one has the ability to have doubts and fears about doing something and still do it. The rationale behind the mechanism M5 modifications is directly related to the ACT core process II, Defusion.

M6—Subjective Obligation. Mechanism M6 identifies words expressing subjective obligation such as "must" and "should," and modifies them into words reflecting free will such as "choose to" or "decide." For example, the sentence "I have to finish this assignment tomorrow." becomes "I choose to finish this assignment tomorrow."

In the embodiment for use with a smart phone, which operates upon a user's verbal communication after it is processed by speech recognition software that operates with the inventive software application program, the inventive method recognizes the non-truthful word and causes the smart phone to send a vibration, a sound or a light signal to alert the user to the text on the screen (or directive): "Repeat the last sentence using 'choose.'"

The rationale behind Mechanism M6 is that conventional use of words inferring subjective obligation reflects and expresses disempowerment. A cornerstone of the inventive method is the observed belief that persons have complete choice over their actions. Truthfully speaking, people do not have to do anything. Some actions may make negative outcomes more likely. And people can choose to do them and face these consequences.

A further observed truthful assertion is that events do not ultimately cause other events. Instead, things happen because they happen, and some events are more often associated with other events for reasons we do not know. "Must" and "Should" imply that there are strong causal relationships between events A conventional example is: "I must get my dog to stop barking or my landlord will evict me," where a Truthful Speaking example is: "I'm observing the thought that I choose to take actions connected with having my dog stop barking. The observed thought is that I make this choice for no particular reason, and the observed belief is that a quite dog is less likely to have me evicted."

Examples that involve "should" regarding separate events independent of the person's actions now follow. That is, conventional speaking is expressed as follows: "When interest rates rise, the price of gold should also rise." A truthful example is: "The thought observed is that a rise in interest rates is connected with a rising price of gold." In the embodiment for use with a smart phone, the inventive method recognizes the non-truthful word and sends a vibration with the text on the screen: "Repeat the last sentence using the phrase "connected with."

The rationale behind the mechanism M6 modifications is directly related to ACT core process II, Defusion and IV, Self as Context. Defusion allows the user to observe and work through the language of subjective obligation. Self as Context presents the user the possibility that as a Universal being, they are in control of their actions even if they cannot control thoughts and feelings. Also related to Self as Context, is that the choice and the action following that choice comes from the essence that they are, not their thoughts and feelings.

M7—Disempowering Words. Mechanism M7 identifies disempowering words such as "try" and "attempt" and substitutes empowering ones such as "will," and "shall." For example, "I will try to get to the theatre on time." becomes transformed to "I will make it to the theatre on time." For that matter, in the embodiment for use with a smart phone, which operates upon a user's verbal communication after it is processed by speech recognition software that operates with the inventive software application program, the inventive method recognizes the non-truthful word and controls the smart phone to vibrate, emit a sound or a light signal to direct the speaker's attention to the text on the screen: "Say your last sentence again with the word 'will.'"

In conventional speaking, use of words such as "try" and "attempt" are common. Such words establish tentative conditions to an outcome when an action is taken. A conventional example is: "I will try to make my dog stop barking by training him if he wants to." Trying literally means not doing. If one is doing something, then they are not trying to do so. As modified by the Truthful Speaking method, the sentence becomes: "I'm observing the thought that I will train my dog to stop barking."

The rationale behind the mechanism M7 modifications is directly related to ACT core processes I, Acceptance, and IV, Commitment. People do use words Like "try" to avoid uncomfortable actions.
Substituting "will" brings the action forward and allows people to accept their feelings. Disempowering words are also treated by the software with prompts for making commitments, as will be shown below.

M8—Discriminating Self from Thoughts, Feelings & Actions.

Mechanism M8 looks to differentiate the person from what the person has. The modification addresses several forms of language ranging from being labeled, to identifying oneself as a thought or a feeling. The basic format is replacing the word "am" with "have," or inserting words or phrases from mechanisms D1, D2 or D3. For example:

"I am an alcoholic" or "I have the condition of alcoholism." "I am angry" or "I am observing feelings of anger" "I am confused." or "I notice confusing thoughts."

In the embodiment for use with a smart phone, which operates upon a user's verbal communication after it is processed by speech recognition software that operates with the inventive software application program, the inventive method recognizes the non-truthful word and controls the smart phone to vibrate or generate and output a sound or light signal with the text on the screen: Say your last sentence again with the phrase "have the."

The rationale behind Mechanism M8 is directly related to ACT core process IV, Self as Context and to underscore that the person is more than the sum of his or her own parts. The parts of the person are their names, roles, body, beliefs, emotions, histories, jobs and so forth. Saying "I'm an engineer" is not truthful. That is the person's occupation, not the person. The essence of the person is the observer of that occupation and all the other experiences they are having in the present moment. Saying "I have a career as an engineer." falls within a truthful context.

M9—Being in the Here-and-Now. Mechanism M9 looks to intermittently or continuously remind the user that they are in the present moment of now. Inserting the word "NOW," or its variants, such as the phrase "I AM IN THE PRESENT MOMENT." into randomly selected sentences, does this. M9 is a suggested simple insertion into the next sentence of a dialogue. As with all mechanisms, the user can configure the percent occurrence of this modification. The words or phrases can be placed inside the sentence, as in the case of: "I'm observing the feeling NOW that math is frustrating me" or between sentences in a conversation such as "This will never work." NOW "I've wasted two weeks on repairing this motor." NOW "It will never get done." NOW. Within a sentence, "now" can be inserted wherever it is grammatically feasible to reinforce the commitment to the present timeframe. A variation of "now" is the word "here." The latter can be combined with the former, or stand alone:

"I am observing my determination here and now to exercise 5 days this week." or "I am experiencing my resolve right here to exercise 5 days this week." The essay was written poorly" or "The essay is written poorly."

The rationale behind Mechanism M9 is directly related to ACT core process III, Now, and that when we] choose to step out of language with the assistance of Mechanisms D1, D2, D3, M5 and M8, the mental constructs of "past" and "future" dissolve. This is (because) they are associated with the assertion that they are only a function of language. Once out of language, there is only the experience of NOW. When looking to conceptualize the concept of NOW, it too disappears as it falls into the realm of language and out of experience. Mechanism M9 looks to continuously bring users back into the experienced moment of NOW and to the experienced place of HERE. Of course smart phone operation is as was already described.

M10—Values and Commitment. Mechanism M10 addresses the value behind two empowering words, "values"

and "commitment." The rationale behind the mechanism M10 modifications is directly related to ACT core processes V and VI. They were discussed in detail above. Process IV, Self as Context is also involved. At times when the user states a word such as "must" or "try," the software will prompt them for a value direction of commitment related to the topic they were discussing. This prompt will ask the user to specifically declare an action and the value connected to that action.

The definition of commitment used here is "A declaration of action whose direct source is the observer of thoughts and feelings (the True Self) instead of the thoughts and feelings themselves." It must be emphasized that commitments always involve actions; never thoughts or feelings. Unlike the other 9 mechanisms, "commitment" has no substitute in the word-phrase pool. A weaker variation utilized in Mechanisms M6 and M7 is "choose." Commitment can be substituted for words like "try" and "must." Commitments, unlike plans, wishes, wants, musts, have to, need to and the like are specific regarding behaviors and time frames.

For example, in both Fully Automated and User-Mediated versions, the sentence "I want to lose weight" results in the following series of prompts on the screen:

"I am committed to doing the following action." The software then prompts the user to be more specific by asking a series of questions. These first include: what specific values are related to this commitment. A list of 8 valued life areas is provided the user on the screen for the client to input. Then questions regarding the behavioral commitment itself follows for the user ton input. These queries include when the action will begin, for how long, what are the specific behaviors, and what are the anticipated positive outcomes.

Sentences can contain multiple Truthful Speaking mechanisms simultaneously. An exaggerated example is: "I want to go to the opera because I have great seats but it's very late and I will try to get there," which becomes according to the inventive method: "I'm observing the thought that I choose to go to the opera NOW, connected with the consideration that I have great seats, and the observed thought that it's very late, and I am committed to getting there."

In the embodiment for use with a smart phone, which operates upon a user's verbal communication after it is processed by speech recognition software that operates with the inventive software application program, the smart phone is controlled to output text prompts on the screen, such as:
  Repeat the sentence using the words and phrases:
  "I'm observing the thought that"
  "choose to"
  "now"
  "connected with"
  "committed to"
The Word-Phrase Pools The inventive truthful speaking method identifies specific words or phrases that distort or fragment experiential reality or disempower actions. These will trigger a replacement with word-phrase selections that clarify and complete a person's experiences and guide them into empowered actions. In addition, strategically inserted words or phrases that assist the user to experience their internal dialogue more objectively, and at an experiential distance, and others that facilitate the person's contacting experiences in the here-and-now, will be utilized from word-phrase pools. The latter will not require specific text to trigger their implementation. User preprogramming or configuration of the percent of sentences such word-phrases are to appear will trigger their utilization. As a result, a vast array of truthful sentences can be generated by users and placed into a collective word pool after being selectively edited for appropriateness of content.

Frequency of use can be determined by what phrases are most popular.

It is essential to the inventive method that the word-phrase pools be as comprehensive as possible. This allows for the identification of all words that disempower actions and distort reality. More importantly, a rich variety of replacement words and phrases, as well as those automatically generated by preprogramming, ensure that the output text appears fresh, creative, and interesting. If this were not so, the user would quickly lose interest in the app. Word-phrase pools and their creative implementation are critical for the truthful speaking application to succeed.

The names of the Word-Phrase Pool lists now follow, with the lists themselves presented thereafter, 1. OBSERVING. Variants include:

| Detecting | Picture | Sketch |
|---|---|---|
| Watching | Consideration | Outline |
| Perceiving | Philosophy | Concept |
| Witnessing | Knowledge | Perception |
| Seeing | Judgment | Impression |
| Spotting | Contemplation | Essence |
| Noticing | Estimation | Substance |
| Viewing | Attitude | Point |
| Beholding | Outlook | Meaning |
| Minding | Perspective | General Picture |
| Looking at | Regard | General Idea |
| Considering | Gist | Principle |
| Understanding | Indication | Fundamental Nature |
| Imagining | Notion | Opinion |
| Reflecting on | Sense | Formulation |
| Reasoning | Conception | |
| Idea of | Image | |

The first word-phrase pool is associated with Mechanisms M1, M2, and M3.

2. POSSESSIVE OBSERVATION. This pool contains many combinations of phrases. Variants include:
  I'm observing the thought that . . .
  There's the observation of the thought that . . .
  There's an observation of the thought that . . .
  The thought being observed is . . .
  The observed thought is . . .
  An observation: . . . (the thought)
  My observed thought is . . .
  My observation of the thought is . . .
  I'm having the observation of the thought that . . .
  I'm experiencing the thought that . . .
  My experienced thought is . . .
  I'm detecting the thought that . . .
  I'm imagining the idea that . . .
  A belief now observed is . . .
  NOTES: In all the above examples feelings and emotions can be fully interchanged with thoughts and beliefs. Ex. "My observed emotion is . . . or "An emotion now observed is . . . ."

This pool is far from exhaustive, and the programming may be able to generate a variety of additional phrases. The second word-phrase pool is associated with Mechanisms M1, M2, and M3.

3. VARIATIONS OF "THOUGHT." Variants include:
IDEA
CONCEPT
REFLECTION
IMPRESSION
BELIEF
DESIGN PLAN
SUGGESTION
CONCEPT
SCHEME
OBJECTIVE
NOTION
SENSE
OPINION
CONCEPTION
VIEW
CONSIDERATION
OUTLOOK
POSITION
POINT OF VIEW
PERSPECTIVE
STANDPOINT OF
REALIZATION OF
CONVICTION The third word-phrase pool is associated with Mechanisms M1, M2, and M3.

4. VARIATIONS OF "FEELINGS." Variants include:
EMOTION
MOOD
SENSATION
REACTION TO
IMPRESSION
SENTIMENT
PASSION
EXCITEMENT
AFFECT The fourth word-phrase pool is associated with Mechanisms M1, M2, M3 and M8.

5. VARIATIONS OF "BUT." Variants include:
HOWEVER
NEVERTHELESS
EXCEPT
YET
JUST
THEN AGAIN
ON THE OTHER HAND
NONETHELESS
ALTHOUGH
IN CONTRAST
YET
STILL
THOUGH
EVEN SO
ALL THE SAME
HITHERTO
APART FROM
ASIDE FROM
WITH THE EXCEPTION OF "The fifth word-phrase pool is associated with Mechanism M4. This word-phrase pool is utilized strictly to identify words that need to be flagged and then substituted with those of another pool.

6. VARIATIONS OF "AND." Variants include:
AND
ALSO
AT THE SAME TIME
SIMULTANEOUSLY
PLUS
MOREOVER
AS WELL
WITH This word-phrase pool is utilized strictly to replace words identified in word-phrase pool 5. The sixth word-phrase pool is associated with Mechanism M4.

7. VARIATIONS OF "BECAUSE." Variants include:
SINCE
AS FOR
FOR THE REASON THAT
THE ORIGIN IS
BASIS
FOUNDATION
GROUNDS
ROOT
SOURCE This word-phrase pool is utilized strictly to identify words that need to be flagged and then substituted with those of another pool. The seventh word-phrase pool is associated with Mechanism M5.

8. VARIATIONS OF "ASSOCIATED WITH." Variants include:
CONNECTED WITH
ATTACHED TO
JOINED WITH
RELATED TO
ALLIED
COUPLED
INTERACTS WITH
LINKED
CORRELATED
INTERRELATED
ACCOMPANYING
CONCOMITANT
CONCURRENT
ATTENDANT
SIMULTANEOUS WITH
SYNONYMOUS WITH
ANALOGOUS
GLUED TO
TETHERED
BOUND TO
FASTENED
TIED
SECURED TO
CHAINED
UNITED This word-phrase pool is utilized strictly to replace words identified in word-phrase pool 7. The eighth word-phrase pool is associated with Mechanism M5.

9. VARIATIONS OF "MUST." Variants include:
SHOULD
NEED
HAVE TO
OUGHT TO
GOT TO
OBLIGATED TO
HAD BETTER
SUPPOSED TO
EXPECTED TO
NECESSARY
REQUIRED TO
REQUISITE This word-phrase pool is utilized strictly to identify words that need to be flagged and then substituted with those of word-phrase pool 10. The ninth word-phrase pool is associated with Mechanism M6.

10. VARIATIONS OF "CHOOSE." Variants include:
SELECT
DECIDE

PICK
CHERRY PICK
PICK OUT
GO FOR
OPT
MAKE UP YOUR MIND

This word-phrase pool is utilized strictly to replace words identified in word-phrase pool 9. The tenth word-phrase pool is associated with Mechanism M6.

11. VARIATIONS OF "TRY." Variants include:
ATTEMPT
GIVE EFFORT
TAKE A CRACK
GIVE IT A SHOT
TAKE A STAB
ENDEAVOR TO
STRIVE
STRUGGLE
UNDERTAKE
WORK ON
MAKE SURE OF This word-phrase pool is utilized strictly to identify words that need to be flagged and then substituted with those of the word-phrase pool 12. The eleventh word-phrase pool is associated with Mechanism M7.

12. VARIATIONS OF "DO." Variants include:
PERFORM
SET TO
ACT ON
TAKE ACTION
BEHAVE This word-phrase pool is utilized strictly to replace words identified in word-phrase pool 11. The twelfth word-phrase pool is associated with Mechanism M7.

13. VARIATIONS OF "AM." Variants include:
FOR "AM" THE VARIANTS ARE "IS" AND "ARE," WHEN DISCUSSING ANOTHER PERSON OR PERSONS AS IN "I AM SAD," "HE IS SAD," "THEY ARE SAD." CORRECTED VARIANTS FOR THE ABOVE ARE: "I HAVE SADNESS," "HE HAS SADDNESS," "THEY HAVE SADNESS."
THE WORD-PHRASE POOL TO "HAVE" IS:
OWN
POSSESS
TAKE RESPONSIBILITY FOR
PURCHASE
BUY
RENT
DWELL IN
LIVE IN This word-phrase pool is utilized strictly to identify words that need to be flagged and then substituted with those of word-phrase pools 1-4. The thirteenth word-phrase pool is associated with Mechanism M7.

14. VARIATIONS OF "NOW." Variants include:
PRESENTLY
IN THE MOMENT
RIGHT NOW
AT THIS TIME IMMEDIATELY
AT THIS INSTANT
AT THIS POINT
AT THIS JUNCTURE,
MINDFULLY YOURS (AT THE END OF A LETTER OR MESSAGE)
THE MANTRA: "NO LANGUAGE, NO LANGUAGE, NO LANGUAGE, NO LANGUAGE, NO LANGUAGE, NO LANGUAGE, NO LANGUAGE, NO LANGUAGE, NO LANGUAGE, NO LANGUAGE, NO LANGUAGE, NO LANGUAGE."

This word-phrase pool is utilized to insert words or phrases into a sentence without replacing anything from the existing text. User programming determines frequency of its use. The fourteenth word-phrase pool is associated with Mechanism M9.

15. VARIATIONS OF "HERE." Variants include:
PRESENTLY
AT THIS SPOT
UNDER MY FEET
IN THIS DOMAIN
UNDER THIS ROOF
WHERE WE ARE
AT THIS JUNCTURE This word-phrase pool is utilized to insert words or phrases into a sentence without replacing anything from the existing text. User programming determines frequency of its use. The fifteenth word-phrase pool is associated with Mechanism M9.

16. VARIATIONS OF "COMMITMENT." There is no word-pool here as there is no word that can properly be substituted so as to convey the true definition of the word. The sixteenth word-phrase pool is associated with Mechanism M10.

17. VARIATION ON BORDERLINE DISEMPOWERING WORDS. Variants include:
MAYBE
POSSIBLY
PERHAPS
IT'S UNCLEAR
IT DEPENDS
I'M NOT SURE Such words border on being disempowering and still have utility in communication. The software flags these words and highlights them in the converted text.

At times these words can be used appropriately and responsibly. In other instances, they can function to disempower action. Therefore, these words will be flagged and color coded on the translated text and will not be altered or replaced. This serves as a caution to make the user mindful of this possibility.

The seventeenth word-phrase pool is associated with Mechanism M7.

18. ENHANCED DISTANCING PHRASES. In looking to create ever more experiential distance between the observer and the observed thoughts and emotions, this phrase pool is created. It looks to combine words and phrases in word-phrase pools 1-4 and other sources so that the text produced is longer and creates further distance between the observer and what is observed.

Variants include:
AN OBSERVED THOUGHT WHICH JUST AROSE OUT OF THE SPACE OF POSSIBILITY THAT IS ME IS THAT . . . THE TV IS BROKEN.
THE CONCEPT AUTOMATICALLY GENERATED BY MY BRAIN AND WITNESSED BY MY ESSENCE IS THAT . . . . IT'S GOING TO RAIN TOMORROW.
I HAVE NO IDEA WHY MY BRAIN JUST BLURTED OUT AND TOLD ME THAT . . . .
HILLARY CLINTON WILL HAVE AN ALL FEMALE CABINET WHEN SHE BECOMES PRESIDENT.

I HAVE THIS PRECONCEIVED, BELIEF WHICH I GET IS BIASED AND DISTORTED BY THE LANGUAGE AUTOMATICALLY REATED BY MY BRAIN THAT . . . .

I'M LOOKING AT THE THOUGHT I'M NOT HAVING, JUST THE ONES THAT MY BRAIN IS GENERATING ALL BY ITSELF, THAT ARE SAYING . . . .

THE THOUGHTS UNCONTROLLABLY GENERATED BY MY BRAIN NOW ARE . . .

The eighteenth word-phrase pool is associated with Mechanisms M1, M2 and M3.

19. APHORISMS. These entail brief sayings consistent with the inventive method non-philosophy and experiential state the app facilitates. The aphorisms are inserted randomly at the user's request.

The aphorisms entail brief sayings consistent with the inventive method non-philosophy and experiential state the app facilitates.

IF IT'S YOU THINKING, THEN STOP THINKING.

DON'T BELIEVE ANY OF THIS. IT'S JUST LANGUAGE.

DO IT FOR NO PARTICULAR REASON.

WHAT I'M ABOUT TO TEXT YOU IS JUST A STORY, NOT REALITY.

SO WUT?

A THOUGHT: MAYBE, JUST MAYBE I CAN ALLOW MYSELF TO THINK AND FEEL ONE WAY AND ACT ANOTHER WAY.

I GET THAT MY BRAIN GETS THAT I GET THAT MY BRAIN IS TRYING TO CONTROL ME THROUGH LANGUAGE, AND MY GETTING ALL THAT IS A PRODUCT OF THE LANGUAGE THAT IT GENERATES THAT I CAN CHOOSE TO JUST OBSERVE OR FALL BACK INTO.

Phrases like these can be randomly inserted to a person texting if they choose this option.

Operation

Once downloaded, configured and operational in a user's computer or smart phone, the inventive method is deployed by turning its functional operation on and off. At start-up, the display function presents a user icon in the display that is responsive to a click for On or Off. When inactive, there will be no modifications to the user's text. More sophisticated options involve the user deciding if only they observe the converted message, the directive generated in response to a spoken communication, or both, or the converted message or directive gets sent on to the recipient of the communication as well as the writer/speaker. The user also has the option of blocking any truthful speaking messages or directives sent by other users.

The inventive method enables the user to translate archived text messages (even those composed before the software is downloaded or received while the program is in "off" mode.)

Chatting with Other Users

If the recipient of a writing has the inventive method or application program operational on their computer, the application programs cooperate so that both users communicate in active "Truthful Speaking" mode. As such, several possibilities of operation will arise, explained by use of the following examples.

User #1 sends a text message to user #2, whereby user #1's typed message is converted via the software. User #2 receives this communication, where the application program running on user 3's compufter converts the incoming text into truthful speaking mode by their own unique criteria of word-phrase pools.

As a result, two separate truthful speaking messages will appear for user #2, those of user #1 and their own conversion of it. This outcome, however, can be simplified in several ways. User #1 can configure its active embodiment of the software program so the outgoing messages are not translated. User #2 can configure its active embodiment so that if user #1 sends an un-translated text, their own software application will convert it.

Similarly, if user #1 opts to send translated text, user #2 can opt to have their software program not translate it. The latter option appears to be simplest and most elegant and at the same time, all options are viable.

This also applies to users who are communicating verbally on respective smart phones, wherein cooperating speech recognition software and speech generation software (plug-ins) are operational.

Chatting with Non-users

Even though the application program that implements the inventive method is downloaded and operational on a user's computer or smart phone, it does not have to be used with outgoing messages/writings or verbal communications. That is, users can use the application program alone or by interacting with others. In the former, the user may compose a text message, paragraph (many pages on their computer) or a recorded voice communication just to themselves and have the application program translate the communication. The user may then e-mail the translated text to their own email or similar program and print it or forward it to other destinations.

When utilizing the application program with other users via texting, e-mail or voice communication, the communication by its design is seamless if all users involved have the application program operational on their computer device. All users can send and receive texts truthfully formatted.

Special considerations are required when one user has the application program and the other does not. Application program users can convert their sentences (spoken or written) into a truthful form and send them out to any other user capable of receiving same. Those who receive such messages but not have the application software nevertheless receive transformed text from users at which the program is operational. They will be unable to translate their own text when responding. This limitation may be circumvented by the program's ability to take that un-translated text, convert it, and e-mail it back to the non-user.

As should be apparent, this possibility may hinge on how much of the applicant program processing occurs within the sending user's computer or smart phone. As a result, the application program allows non-users to translate their own texts when they are interacting with program users. The motivation for non-users to download the application program is that they will be enabled to use the programming for individual use and with other users who do not yet have the software.

Alarm Minders

The alarm minder module or sub-process allows the user to program reminders on when and how often to place the truthful speaking software in active mode. Shifting modalities can even be done while the user is unaware. They can be typing or texting in "off" mode when suddenly sentences appearing truthful speaking mode, as they were programmed previously.

Customized Language

Upon activating the Truthful Speaking application program, a menu bar will display the 10 Mechanisms and the 16 Word-Phrase pools. The user relies upon the user interface to access these functions make personal modifications to the default operation. For the Mechanisms, the user specifies a range between 0% and 100% of how frequently the software will modify a sentence when presented with an opportunity. For Word/Phrase pools, the user specifies the percentages of each word or phrase to be substituted. The user will also be enabled to insert their own word-phrase entries to customize their Truthful communication.

Text Porosity

In conventional mobile phone texting, the words of every sentence appear simultaneously and in black text. To make a somewhat artificial language like that generated by the application program more approachable, software generated timing of phrases is implemented by the inventive method. Here, rather than a sentence appearing simultaneously, the words in a sentence are staggered so as to mimic speech. For example, the sentence "The thought I now observe is that the Netherlands will win the World Cup" shows up as:

"The thought . . . I now observe . . . is that . . . The Netherlands . . . will win . . . the World Cup."

The entire sentence appears on one screen without the periods. The periods represent brief lapses in time. Text color coding also is implemented to enrich the communication based on the mood of the content. This option can be a stand-alone app separate from the Truthful Speaking software to enhance all texts.

Text Display

For each sentence, the user types text, which will appear on the top of the screen. The revised version will appear underneath. There will be an option to see the modifications made, identifying the mechanism(s) used at the very bottom of the screen. Incoming text will be treated similarly.

Text Editing

After a sentence is modified by the software, the user can directly edit the text before sending it, or press an icon requesting that the software generate a new modified sentence based on the original text. This can be done repeatedly, since there is a multitude of potential variations to the original sentence. Whatever modified sentence is chosen can then be further edited directly by the user before being sent out.

Ongoing Enhancements of User's Word-Phrase Pools and Sentences

Over time, a user's word-phrase pool is increased and modified in a number of ways. First, the user may access the pools and add their own unique words or phrases (i.e. "I copy that . . . " as an alternative to "I observe that . . . "). Second, the user may access the pool and modify the probability of each word's use. Third, when they actively use the sentence editing icon, the software continuously monitors their choices of computer generated sentences that they send on and learns which words and phrases they prefer. More importantly, the inventive software application program learns and modifies the particular sentence structures they are most comfortable with. Fourth, an icon is created which the user presses when a particularly good truthful speaking sentence was generated by the software. Fifth, when a Truthful Speaking chat room is created, vast new word pools and sentence configurations can be developed and shared by all users.

Self-Monitoring and Feedback

Allows the user to get information on the number of instances in their text or any other text where what they write needs to be modified by the program and what those modifications are. For example, the information would be that in 450 sentences, 23 D1, 32 D4, 17 D6 etc. modifications were made. In this way, the person can learn effective skills while relying less on the software. This is then adapted into speaking truthfully without the use of the application program. Immediate feedback for each sentence typed will also be an option.

Positive Reinforcement

In this modality, the user is required to utilize all rules of truthful speaking without the aid of the application program. When the user conforms to the majority of the rules, the programming makes fewer corrections to the handful of errors that are made. Thusly users are reinforced or rewarded by having their text unaltered. If the user makes a higher percentage of errors, the programming will begin making alterations. The intention here is for the user to be gradually shaped into typing truthfully without the distraction of being frequently corrected by the application program.

Commitment and Action

Permits the user to declare commitments to actions and keep track of those actions. The inventive software application program also can remind the user of commitments made in the past when Mechanism 10 was employed when texting.

Training and Feedback

An object of the inventive software application program is to train users on speaking truthfully on their own. The training is occurring naturally in all aspects of the user employing the system. Over time, their use of non-truthful words will extinguish, while spontaneous insertions of empowering words and phrases will increase as the result of positive reinforcement in utilizing such terms. Feedback will be stored regarding the number of non-truthful errors the user makes in a conversation as well as the number of inserted suggestions given by the software application program.

Truthful Speaking Mechanism Key

| NUMBER CODE | MECHANISM |
| --- | --- |
| D1 | "I THINK" |
| D2 | "I'M OBSERVING THE THOUGHT THAT" |
| D3 | "THERE'S THE OBSERVATION OF THE THOUGHT THAT" |
| M4 | BUT/AND |
| M5 | BECAUSE/ASSOCIATED WITH |
| M6 | MUST/CHOOSE |
| M7 | TRY/DO |
| M8 | I AM, YOU ARE/I HAVE, YOU HAVE |
| M9 | NOW/HERE |
| M10 | COMMITMENT |

In Mechanisms D1-D3, the term "feelings" or their variations can be substituted for "thoughts," when appropriate. The application program defines feelings as one-word descriptions of what is going on inside the body. Mechanism M8 addresses this more directly, and it shows up in the D1-D3 Mechanisms.

Mechanisms of Advanced Translation 2

There's the contemplation of the consideration (D3) that this is so unfair. It is linked (M5) with the reflection (D1) of you totally ignoring what we spoke about yesterday. I am immersed in the emotion of anger (M8), and entertaining the judgment (M2) that I opt (M6) to no longer speak to you until you change your mind.

Software Combined with Conventional Text (M1, M2 & M3 Mechanisms have been programmed to occur every $3^{rd}$ sentence on average. All other mechanisms are programmed at 100%)

David: I love my dog but he barks too much. I get really angry when he does this. Yesterday my landlady told me that if he doesn't stop, I'll have to get rid of him. I try teaching him not to do it, but he just keeps on barking David: I'm observing the thought that 1 love my dog. There are feelings of anger in me associated with his doing this. Yesterday my landlady told me that if he doesn't stop I will be getting rid of him. My observed thought is that I teach him not to do it and he just barks.

Robin: I'm sorry to hear that. Have you tried taking him to obedience school classes?

Robin: I'm sorry to hear that. I'm noticing the idea that you have taken him to obedience school classes?

David: No. I don't think it'll work because he doesn't get along well with other dogs. Plus, they're so expensive. I'm frustrated. I don't know what to do.

David: No. The belief I'm experiencing is that it will not work. That's associated with the conviction that he doesn't get along well with other dogs.

Robin: If you can't afford it, maybe you should get some books on dog training and do it yourself.

Robin: If you can't afford it maybe you can get some books on dog training and do it yourself.

David: That's a good idea. Maybe I'll go to the library tomorrow and get something. 1 hope he listens. It seems pretty hopeless now. I have to get him to stop barking or I'll find myself on the street.

David: That's a good idea. I commit to going to the library tomorrow and getting something. I'm observing the opinion that he will listen. An opinion: It appears hopeless. I choose to get him to stop barking or I'll find myself on the street.

Robin: Sounds like you have a pretty good plan there.

Robin: I'm observing the impression that you have a pretty good plan here.

David: Yea, I hope it'll work.

David: Yea, I'm committed to having it work.

The inventive method, i.e., application program or software enhances personal growth in a variety of areas. When communicating with others, users input text into a computer or smart phone, which is then modified, and likewise receive modified return messages. Ten mechanisms and eighteen or nineteen word/phrase pools monitor the text and modify it under specific criteria.

To operate the inventive method on a user's smart phone, the user downloads the truthful speaking software application program to his or her smart phone. When installed, the software application program provides a TS icon in an area of the smart phone display. The user activates the TS icon, which "opens" the homepage and provides the user with a further a choice of activating several other icons associated with other functionalities.

A. The TS ON icons for:

1. Activating expressive and/or receptive voice telephone conversations. Specifically, the user chooses to have the software monitor and give text feedback with associated tone to anything spoken by them into the smart phone and/or anything spoken by another person having a conversation with the user.

2. A modality where a user may obtain feedback and correction from their smart phone even when not connected to another party. They engage in a monologue and receive feedback and correction. This activity is especially helpful for practice and training in truthful speaking.

3. A modality where 2 or more users may speak into the same smart phone in a face-to face conversation.

4. Parallel options will likewise be available for texted input and output on smart phones, tablets and computers.

Once the modality of communication and users have been selected, a host of mechanism options for each of the 10 truthful speaking mechanisms are offered.

If the user chooses to bypass this option, it results in continuous feedback and phrase insertions for each statement they make.

A list of preprogrammed mechanism options is offered to the user so as to make conversation appear less cumbersome, more spontaneous and inviting. These preprogrammed options will have suggestions from selected word phrase pools as to what circumstances they may best be employed in. For example, field testing the software with volunteer subjects may indicate that one type of preprogrammed option is best for casual conversation with friends and family while another is best suited for negotiating in business.

For all 10 mechanisms, users may generate their own specific set of parameters to achieve greater fluency in their truthful speaking.

1. The frequency of sentences for a given mechanism that the software corrects a non-truthful statement. For example, every fourth non-truthful word or phrase on average prompts the user.

2. The frequency of insertions made by the software. For example, every tenth sentence on average will prompt the user to insert a word or phrase in the following sentence.

3. Users may easily disable any mechanism by requesting zero percent use of said mechanism.

Mechanism user options also include the ability to modify all word phrase pools by inserting or deleting words or phrases. For example, a user may opt to delete the phrase "need to" while retaining "have to." They may simply elect to continue to use the latter phrase while rejecting all other like-disempowering words.

Users also have the ability to make insertions in word/phrase pools. This is particularly helpful when there are many slang and idiosyncratic words between two or more users. For example, "cuz" "'cause" and the like can be inserted, and the software will identify it as a non-truthful word. Likewise inserting "hell-bent on" in the word /phrase pool will result in this being prompted in addition to the phrase "chose to".

The extent to which every user can make diverse multiple and continuous changes to how they speak and interpret the language of others, makes this application substantially different from any other stylistic software. To summarize, users have the ability to control:

The complexity of a revised sentence by correction or insertion can be altered by the user as well.

For example, the following truthful sentences, which convey the same information, are presented from less complex to very complex.

"I'll try to be on time in the future."

"I will be on time in the future,"

"I choose to be on time in the future."

"I now choose to be on time in the future."

"I now commit to be on time in the future."

"I'm observing the thought that I now choose to be on time in the future for no particular reason other than I choose to."

The Truthful Speaking method, system and application program, in their respective automatic and user-mediated forms do not simply take text or the spoken word and modify it. Instead, it is a tool that enables the user to create their own unique stylistic language. With the options provided, a near-infinite set of stylistic variations are possible, all guided by the core principles of a philosophy with the goals of empowering actions and improving relationships.

The user is not a passive recipient to the application's preprogrammed output. Instead, he or she actively utilizes the software as a tool to obtain an outcome. Metaphorically, with other stylistic applications, the user is like a passenger in a car, passively going where the programming takes them. With the Truthful Speaking method, system and application program, the user is the driver who determines his or her own destination by implementing the many software options actively. A further and essential metaphor is that their ability to modify all word phrase pools is the equivalent of opening the hood and making essential changes to the car to suit their needs. The numerous choices given users to quickly and easily make substantial changes to their expressive and receptive styles results in fuller self-expression in different social situations. It also permits the user to experiment on his or her tailored programmed styles to maximize effectiveness concerning positive experiential reactions, the reactions of others and the behavioral outcomes concerning goals and relationships associated with their created styles of Truthful Speaking.

A unique feature to the user-mediated version of the inventive method, system and application program, is that it can accomplish its goals of language processing in a way that requires no grammar-check software to modify output, and minimal voice recognition software. A grammar processing software can have technical issues in its installation and implementation. Cost of the software is also a factor. Likewise, a fully functional state of the art voice recognition software package still lacks consistent accuracy and can also be costly. By limiting voice recognition to less than a hundred non-truthful words from the word-phrase pools employed, the scope of voice recognition becomes substantially simplified.

It cannot be emphasized enough how the user-mediated version can be easily and quickly applied to its dissemination in many languages. The present invention is an improvement over programs that fully translate text, requires voice recognition and grammar check for each language. This can be an expensive and time consuming task. In addition, there are many languages that do not have such software. Voice recognition software in different languages also has the same shortcomings. The Truthful Speaking, User-Mediated method, system and application program, can easily be established for any language. All one need do is program the word-phrase pools in that language and provide simple directions cuing the user on use and provide instructions on how to utilize the software application. Voice recognition software can easily be created because it need only identify a limited number of words from the non-truthful word-phrase pools.

Yet a further application of the user-mediated Truthful Speaking method, system and application program, is that it can be adapted to children of various ages. This again is done by tailoring the various mechanism options as well as simplifying the word-phrase pools replacing non-truthful words as well as insertions.

There is also a unique role that the user-mediated method, system and application program, can have in training people in learning Truthful Speaking without the use of a smart phone. People in different parts of the world do not have continuous access to a smart phone. An instructor can utilize a smart phone in a class or individual training session with the smart phone and give the students written instructions and written word-phrase pools in their unique language to take home and practice using the user-mediated approach. In later classes the student practices via the instructor's smart phone and can receive immediate feedback, tested and graded by the software. Lastly, in cases where no technology is available at all, the inventive method, system and application program can be taught in paper format only, with an instructor, having been trained by the software acting as the direct and immediate source of verbal training and feedback. These again are examples of how a user-mediated approach can accommodate and successfully address barriers that more traditional applications cannot.

Once specifying all user options, the user initiates a telephone call.

It is recommended that the user employ the smart phone's speaker option, when the inventive method or application program is operational therein. In this way he or she can immediately see a suggested word or phrase provided by the inventive method after a phone vibration (or other alert signal) is output. In the case of an insertion, the user will incorporate it into their next sentence. If a correction to a non-truthful word is given, for example "but", the application prompts the user with a vibration immediately after the disempowering word is stated, followed by the phrase on the screen.

Say:
"Put another way . . . .
Use
AND
not
BUT
The user then implements the suggestion in their own words. With inserted sentences a vibration at the end of the sentence is followed by: Begin the next sentence with the phrase: "I'M OBSERVING THE THOUGHT THAT . . . "
At all times, in active truthful speaking mode, the user will have access to several options.
1. MECHANISM OPTIONS as outlined above. Editing is available at all times
2. VERBAL INFORMATION PROCESSED OPTION. What the software process: User input only, colleague input only, user and colleague input,
3. "REWRITE" OPTION. The user can request an alternate version of an input multiple times until they are satisfied with the correction.
4. "TRUTH UP" OPTION. THE USER AT ANY TIME CAN REQUEST TRUTHFUL INSERTIONS TO THEIR NEXT SENTENCE.
5. "COMMIT UP" OPTION. The user requests to go into Commitment mode as described in M 10.

EXAMPLES

Figure 4B:
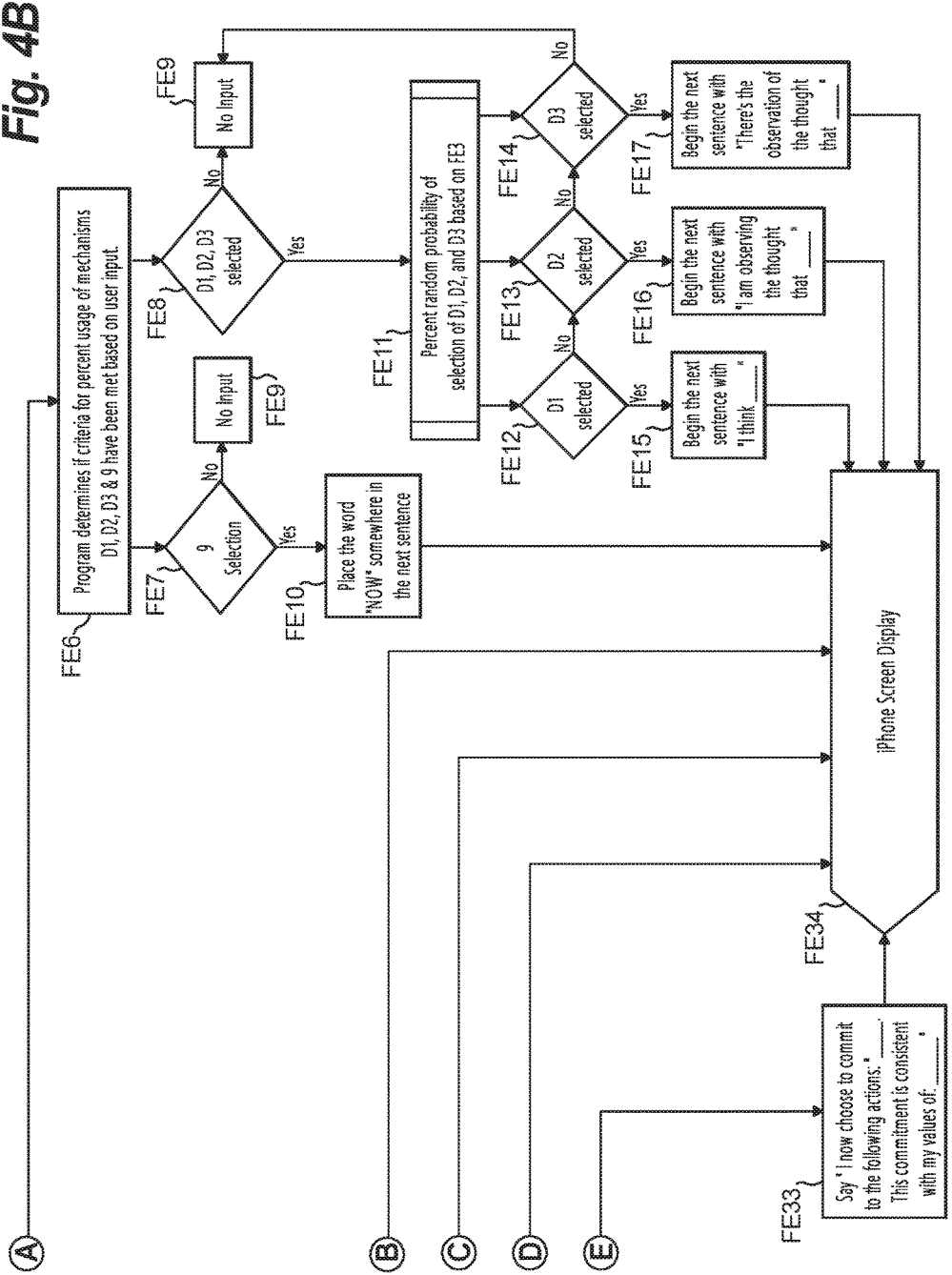
FIG. 4 is a flowchart highlighting an embodiment of the inventive method for use in an electronics communications device, such as, for example, a smart phone.

The FIG. 4 flowchart presents an Example of one or more embodiments of the inventive method.

For example, FIG. 4 shows a flow chart of an example of the present invention in use. The "User Mediated Truthful Speaking" method is started on the user's electronic communications device, such as a smart phone, in the box labeled as reference numeral symbol FE1.

At box FE2 in FIG. 4 the user inputs the type of prompts for alerts (vibrations tones, both or none).

Then at box FE3 in FIG. 4 the user, inputs a percent implementation of several mechanisms, such as, but not necessarily limited to for example, D1, D2, D3 and M9.

Thereafter, at box FE4 in FIG. 4, a single sentence verbal (voice) input is placed into the electronic communications device.

Then at box FE5 in FIG. 4, voice recognition is enacted to identify specific non-truthful words from desired word phrase pools.

The user's option after the steps of box FE 4 in FIG. 4 are both box FE5, about voice recognition, and, FE6, where the program determines if a criteria for percentage usage of the mechanisms D1, D2, D3 and 9 have been met, based upon user input. If so, the options are FE7, select 9, FE8, select D1, D2 or D3 and if so, then if F9 is selected there is no input. Or, the option would be to go from FE7 to FE10, where the box is to place the word "now" somewhere in the next sentence. Or, if the user is at FE8 box, then he or she proceeds to box FE11 where the percent random probability selected by the user for D1, D2, and D3 in FE3 is implemented. If that is the case, then the options are diamond-shaped box FE12, which is where D1 is selected, or diamond-shaped box FE13, where D2 is selected, or diamond-shaped box FE14, where D3 is selected. If 12 is selected, then user proceeds to box FE15 to begin the next sentence with the words "I think". Or, if D2 was selected, the user goes to box FE16 and begins the next sentence with "I have the thought that," and if D3 was selected in box FE14, then user proceeds to box FE17, which is beginning the next sentence with, "There's the observation of that". After these, are options noted in boxes FE15, FE16 or FE17 in FIG. 4 which, when one option box is selected, the users' input then goes to an iPhone® or other electronic communication device's screen display, which is box FE 34, the culmination of the use of the system. Getting back to box FE7, which is where mechanism 9 is inserted, then the user proceeds to box FE10 and places the word "now" somewhere in the next sentence and, if so, then he or she proceeds to culmination box FE34 to the screen display. Concerning correction mechanisms originating in box FE5 in FIG. 4 for voice recognition the user proceeds to diamond box FE18, where a "but" word phrase pool is chosen. If "yes", then the user proceeds to box FE19, choosing the word "and" in the word phrase pool and if that is chosen, then he or she goes to box FE20 in FIG. 4, which is to "repeat the sentence using selected words of "_____" instead of "_____". (The inventor notes that the blank lines in quotes in this description of flowchart FIG. 4 signify the user selected words herein and hereinafter) If, however, in box FE18 in FIG. 4, the user does not use the word "but", then the user can go to diamond-shaped box FE21 with the word "try" in the word phrase pool. If "yes", then there is a 90 percent probably the user will proceed to diamond box FE22 and then to box FE23, (FE23 is a box not a diamond) if yes, with a word phrase pool. And if that's the case, then the user also, again, alternately proceeds to box FE20 in FIG. 4, which is "repeat the sentence using _____ instead of _____", If in box FE22 in FIG. 4 the answer was no, he or she would proceed to box 30B, Commitment and Values subroutine and then taken to diamond FE31 where they are offered a choice of making a commitment or not. If yes, they go to box FE33 where they specify their commitments. If no, they are taken to box FE20. Now, if the user chooses box FE21 in FIG. 4, where the user tries a word phrase pool, but if "no" is selected, then he or she goes to box FE24 in FIG. 4, with the word "must" is in a word phrase pool. If that's the case, then he or she proceeds to FE25 box, where the user chooses the word phrase pool and, if so, proceeds to box FE20 with "repeat the sentence using _____ instead of _____." However, in FIG. 4, if in box FE24 the "must" word is not used and he or she proceeds to "no", he or she goes to diamond-shaped box FE26, where the word "because" is in the word phrase pool.

If yes, then the user proceeds to box FE27, where "connected with" is in the word phrase pool and, ultimately, to box FE20, with "repeat the sentence using _____ instead of _____." However, if in diamond box FE26 the word "because" is not used, then user proceeds to box FE28, where "am" is in the word phrase pool, and if "yes", he or she proceeds to box FE29A, where the word "have" is in the word phrase pool. If that is the case, then he or she proceeds to box FE30A in FIG. 4, which is that, if the word "am" is followed by a noun, the user repeats the sentence using the word "have" and if that's the case he or she then proceeds to the screen display of the device in culmination box FE34. However, if "am" is not used in box FE28, the user proceeds to box FE29B, with the word "feeling" in the word phrase pool. If that is "yes", then he or she proceeds to, box FE29D, to repeat the sentence using, "I'm observing the feeling of _____" and if that's the case, he or she then proceeds to the smart phone or other electronic device screen display in the culmination in box FE34 in FIG. 4. However, if the word "feeling" is no, there would be no input, which is in box FE29C. in FIG. 4

The only other options are that when the user proceeds alternately from boxes FE19, FE22, FE25, FE27, FE29A to box FE20 in FIG. 4, which is "repeat the sentence using instead of", the user can go to either the screen display as noted before in culmination box FE34 in FIG. 4, or go to box FE30B, where the words "commitment" and "values" are used. And, if "yes", the user proceeds to diamond box FE31, which is the user selection to commit. If "no", the user goes on directional line FE20 back to "repeat the sentence using "_____" instead of "_____". However, if the user did select yes about the values, he or she then proceeds finally to box FE33 in FIG. 4, which says, "I now commit to choose the following action" and "This commitment is consistent with the values of _____, such as in mechanism 9". And in that case, the user then also proceeds to end the current selections by going to the final box, as before, FE34, which is the screen display in FIG. 4. All outputs of FE 20 and FE 31 will occur on iPhone display FE 34 concurrently on a given sentence. Only one output of FE 12, FE 13, and FE 14 can occur in iPhone display FE34 for any given sentence.

FIG. 4 therefore shows the steps of a method for processing a user's spoken communication received by an electronic communications device with input and output capable of recording and processing verbal or textual material and converted to text thereby, to assess relationships between words and phrases of selected word phrase pools, in the spoken communication, where necessary, to generate a directive to the user on how he/she might modify future spoken communications to more clearly convey a semantic content intended, for purposes of self-help and self-training in the user's spoken communications, where the method comprises the steps of:

a) the user speaking and the electronic communications device receiving the user's spoken communication;

b) processing to translate the received spoken communication to a textual form and to implement one or more mechanisms to provide at least one of user cues of the spoken communication of the user in textual form, in accordance with a plurality of rules to identify semantic content;

c) based on the user cues, and the semantic content of the spoken communication in textual form, determining how relationships between the words and phrases comprising the spoken communication could be altered to more clearly convey the semantic content intended by the user, where necessary, to realize a directive to the user with one or more suggestions for changing future spoken communications; and providing the directive to display device included with the smart phone.

d) preprogrammed insertions of directives for user on future spoken communication in the absence of prior verbal cuing. (This addresses the four insertion mechanisms. Input on the screen is prompted by instructions to the software so as to how often to cue a truthful statement, not by a non-truthful word)

The electronic communications device is selected from the group consisting of a smart phone, a tablet, a desktop computer, a laptop computer, a smart watch or any current or future device capable of receiving and processing verbal or textual material.

The aforementioned directive further comprises at least one pre-programmed inserted directive for the user for future spoken communication in the absence of prior verbal cuing, wherein:
  a) user input on the screen of the device is prompted by instructions to the device's software, so as to how often the device is to cue the user with a truthful statement to be inserted, or,
  b) user input is a pause between sentences.

The method for processing further includes wherein user input is a user cued instruction to the software to prompt the user at specified intervals to instruct the user on a proper insertion of a word pool phrase.

The one or more mechanisms include at least one of an insertion mechanism, a correction mechanism or a combination of an insertion and correction mechanism.

The insertion mechanism is a mechanism for insertion of a word or phrase to perform computer generated cues from the word phrase pool, and optionally wherein said correction mechanism is a verbal inputted correction with linguistic analysis, or wherein the mechanism is both an insertion mechanism and a correction mechanism.

Voice Recognition can be minimally used, and the method can be used in many different languages.

The step of providing the directive includes memory-storing the directive, optionally, wherein the step of providing the directive includes alerting the user to the displayed directive. For example, the alerting can include vibrating the electronic communications device (such as a smart phone), emitting a sound from the device or emitting a light signal from the device.

The aforementioned step of processing includes that one or more mechanisms operate in reliance upon at least one word phrase pool of at least one word.

Optionally, the step of processing includes that the mechanisms operate in reliance upon a plurality of word-phrase pools in a plurality of specific categories, wherein the at least one word phrase pool is a plurality of word phrase pools.

Determining to realize the directive includes generating a map of differences between the spoken communication in textual form and the proposed altered text and generating an explanation of the differences therebetween, optionally wherein the map includes a listing of the semantic rules used to realize the directive, which can be communicated textually, and/or translated into a spoken communication using a speech generating plug-in operational in the electronic communications device.

The altering of the relationships includes generating a description highlighting a difference between a connotation of the altered words, phrases, signs and symbols altered before and after alteration.

The directive preferably enables focused goal-directed action by the user.

The method of processing may also further comprise a step of configuring and pre-programming the processing to define how often each mechanism is utilized in the step of processing.

The present invention is optionally also a computer program product comprising program code means embodied in a non-transitory computer readable medium, which upon processing by a computer, executes a method of processing a user's spoken communication, received by an electronic communications device and converted to text thereby, to assess relationships between words and phrases of selected word phrase pools, in the spoken communication, where necessary, to generate a directive to the user on how he/she might modify future spoken communications to more clearly convey a semantic content intended, for purposes of self-help and self-training in the user's spoken communications, wherein the method comprises the steps of:
  the user speaking and the smart phone receiving the user's spoken communication;
  processing to translate the received spoken communication to a textual form and to implement one or more mechanisms to perform a linguistic analysis on the spoken communication in textual form, in accordance with a plurality of rules to identify semantic content;
  based on the linguistic analysis, and the semantic content of the spoken communication in textual form, determining how relationships between the words and phrases comprising the spoken communication could be altered to more clearly convey the semantic content intend by the user, where necessary, to realize a directive to the user with one or more suggestions for changing future spoken communications; and
  providing the directive to display device included with the electronic communications device, such as a smart phone.

The present invention is also for an electronic communications device programmed to process processing a user's spoken communication, received by the electronic communications device and converted to text thereby, to assess relationships between words and phrases in the spoken communication, where necessary, to generate a directive to the user on how he/she might modify future spoken communications to more clearly convey a semantic content intended, for purposes of self-help and self-training in the user's spoken communications, the electronic communications device comprising:
  a microphone for capturing a communication spoken by a user of the electronic communications device;
  a processor for processing and translating the captured spoken communication to a textual form and implementing one or more mechanisms to perform a linguistic analysis on the spoken communication in textual form, in accordance with a plurality of rules to identify semantic content;
  wherein based on the linguistic analysis, and the semantic content of the spoken communication in textual form, the processor further determines how relationships between the words and phrases comprising the spoken communication could be altered to more clearly convey the semantic content intend by the user, where necessary, to realize a directive to the user with one or more suggestions for changing future spoken communications for the purposes of the user's self-help and self-training in spoken communications, and,
  a display device by which the directive is communicated to the user.

The electronic communications device is preferably selected from the group consisting of a smart phone, a tablet, a desktop computer, a laptop computer, a smart watch or any current or future device capable of receiving and processing verbal or textual material.

The aforementioned electronic communications device optionally further comprises an icon displayed on the display device that the user clicks on to activate the processing.

The electronic communications device optionally comprises a list of preprogrammed mechanism options.

The electronic communications device preferably uses a plurality of mechanisms such as, for example ten mechanisms, and wherein for all 10 mechanisms, users may generate their own specific set of parameters to achieve greater fluency in their truthful speaking.

The method can be adapted to any language by inserting several hundred foreign words consistent with the mechanisms in the word phrase pools, with no required change in programming. To have the ability to simply plug in a few hundred words in the word phrase pools with no alteration in programming is advantageous in many ways. First, no word recognition software is required. The program is simply analyzing sounds in word phrase pools. Second, no grammar check or language recognition or generation is required. Third, many languages and dialects have no software associate with them, and ordinarily truthful speaking would not be available. In fact, there are 6,909 distinct languages today. It is important to have a tool that can reach as many people as possible.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

APPENDIX

References

Kabat-Zinn; Jon; Univ. of Mass. Medical School, "Mindfulness-Based Interventions in Context: Past, Present and Future," Commentaries, DOI: 10.1093/clipsy/bpg016, American Psychological Association D12, 2003, pages 144-156

Hayes, S. C. and Smith, S. (2005), Get Out of your Mind and into your Life: the new acceptance and commitment therapy. Oakland, CA: New Harbinger.

Hayes, S. C. February 2006 Time Magazine article.

Gestalt Therapy Verbatim

Originally published:1969

Author: Fritz Perls

Gestalt Therapy Now

Book by Joen Fagan 3.7/5AbeBooks3.7/5Goodreads

Originally published: 1970

Author: Joen Fagan

Editors: Joen Fagan, Irma Lee Shepherd

Wherever You Go, There You Are

Originally published: 1994

Author: Jon Kabat-Zinn

A Buddhist Bible, edited by Swight Goddard, Beacon Press, Boston, 1994

What is claimed is:

1. A method for processing a user's spoken communication received by an electronic communications device with input and output capable of recording and processing verbal or textual material and converted to text thereby, to assess relationships between words and phrases in the spoken communication, where necessary, to generate a directive to the user on how he/she might modify future spoken communications to more clearly convey a semantic content intended, for purposes of self-help and self-training in the user's spoken communications, the method comprising the steps of:

the user speaking and the electronic communications device receiving the user's spoken communication;

processing to translate the received spoken communication to a textual form and to implement one or more mechanisms to provide at least one of user cues of the spoken communication of the user in textual form, in accordance with a plurality of rules to identify semantic content;

based on the user cues, and the semantic content of the spoken communication in textual form, determining how relationships between the words and phrases comprising the spoken communication could be altered to more clearly convey the semantic content intend by the user, where necessary, to realize a directive to the user with one or more suggestions from selected word phrase pools for changing future spoken communications; and providing the directive to a display device included with the electronic communications device; and, providing preprogrammed insertions of directives for the user on future spoken communication in the absence of prior verbal cuing.

2. The method for processing as in claim 1, wherein said electronic communications device is selected from the group consisting of a smart phone, a tablet, a desktop computer, a laptop computer, and a smart watch.

3. The method for processing as in claim 1, wherein user input is prompted by instructions presented on a screen of the display device that are generated by computer software operational in the electronics communication device, said user input identifying how often the device is to cue the user with a truthful statement to be inserted.

4. The method for processing as in claim 3, wherein the user input is a pause between sentences.

5. The method for processing as in claim 3, wherein the user input is a user cued instruction to the software to prompt the user at specified intervals to instruct the user on a proper insertion of a word pool phrase.

6. The method for processing as in claim 1, wherein the one or more mechanisms include at least one of an insertion mechanism, a correction mechanism or a combination of an insertion and correction mechanism.

7. The method for processing as in claim 6, wherein said insertion mechanism is a mechanism for insertion of a word or phrase to perform computer generated cues from the word phrase pool.

8. The method for processing, as in claim 6, wherein said correction mechanism is a verbal inputted correction with linguistic analysis.

9. The method for processing, as in claim 6, wherein said mechanism is both an insertion mechanism and a correction mechanism.

10. The method for processing according to claim 1, wherein the step of providing the directive includes memory-storing the directive.

11. The method for processing according to claim 1, wherein the step of providing the directive includes alerting the user to the displayed directive.

12. The method for processing according to claim 11, wherein the alerting includes vibrating the smart phone, emitting a sound from the smart phone or emitting a light signal from the electronic communications device.

13. The method for processing according to claim 1, wherein the step of processing include that one or more mechanisms operate in reliance upon at least one word phrase pool of at least one word.

14. The method for processing according to claim 1, wherein the step of processing includes that the one or more mechanisms operate in reliance upon a plurality of word-phrase pools in a plurality of specific categories, wherein said at least one word phrase pool is a plurality of word phrase pools.

15. The method for processing according to claim 1, wherein the determining to realize the directive includes generating a map of differences between the spoken communication in textual form and the proposed altered text and generating an explanation of the differences therebetween.

16. The method for processing according to claim 15, wherein the map includes a listing of the semantic rules used to realize the directive.

17. The method for processing according to claim 1, wherein the directive is communicated textually.

18. The method for processing according to claim 1, wherein the directive is translated into a spoken communication using a speech generating plug-in operational in the electronic communications device.

19. The method of processing as set forth in claim 1, wherein altering the relationships includes generating a description highlighting a difference between a connotation of the altered words, phrases, signs and symbols altered before and after alteration.

20. The method of processing as set forth in claim 1, wherein the directive enables focused goal-directed action by the user.

21. The method of processing as set forth in claim 1, further comprising a step of configuring and pre-programming the processing to define how often each mechanism is utilized in the step of processing.

22. The method according to claim 1, wherein said one or more mechanisms are 10 mechanisms.

23. The method according to claim 1 wherein use of said one or more mechanisms is adaptable to any foreign language by inserting several hundred foreign words of said any foreign language that are consistent with said one or more mechanisms in said word phrase pools, except programming said selected word-phrase pools in said foreign language and providing simple directions cuing a user on use and providing instructions on how to utilize said one or more mechanisms.

24. A computer program product comprising program code means embodied in a non-transitory computer readable medium, which upon processing by a computer within an electronics communication device, executes a method of processing a user's spoken communication, received by the electronic communications device and converted to text thereby, to assess relationships between words and phrases in the spoken communication, where necessary, to generate a directive to the user on how he/she might modify future spoken communications to more clearly convey a semantic content intended, for purposes of self-help and self-training in the user's spoken communications, the method comprising the steps of:
  the user speaking and the electronics communication device receiving the user's spoken communication;
  processing to translate the received spoken communication to a textual form and to implement one or more mechanisms to perform a linguistic analysis on the spoken communication in textual form, in accordance with a plurality of rules to identify semantic content;
  based on the linguistic analysis, and the semantic content of the spoken communication in textual form, determining how relationships between the words and phrases comprising the spoken communication could be altered to more clearly convey the semantic content intend by the user, where necessary, to realize a directive to the user with one or more suggestions from word phrase pools for changing future spoken communications; and
  providing the directive to a display device included with the electronics communication device.

25. The computer program product of claim 24, wherein use of said one or more mechanisms is adaptable to any foreign language by inserting in said computer program product several hundred foreign words of said any foreign language that are consistent with said one or more mechanisms in said word phrase pools, programming said selected word-phrase pools in said any foreign language and said computer program product providing simple directions cuing a user on use and providing instructions on how to utilize said one or more mechanisms.

26. A electronic communications device programmed to process a user's spoken communication, received by the electronic communications device and converted to text thereby, to assess relationships between words and phrases in the spoken communication, where necessary, to generate a directive to the user on how he/she might modify future spoken communications to more clearly convey a semantic content intended, for purposes of self-help and self-training in the user's spoken communications, the electronic communications device comprising:
  a microphone for capturing a communication spoken by a user of the electronic communications device;
  a processor for processing and translating the captured spoken communication to a textual form and implementing one or more mechanisms to perform a linguistic analysis on the spoken communication in textual form, in accordance with a plurality of rules to identify semantic content;
  wherein based on the linguistic analysis, and the semantic content of the spoken communication in textual form, the processor further determines how relationships between the words and phrases comprising the spoken communication could be altered to more clearly convey the semantic content intended by the user, where necessary, to realize a directive to the user with one or more suggestions from word phrase pools for changing future spoken communications for the purposes of the user's self-help and self-training in spoken communications;
  a display device by which the directive is communicated to the user.

27. The electronic communications device according to claim 26, further comprising an icon displayed on the display device that the user clicks on to activate the processing.

28. The electronic communications device according to claim 26, further comprising a list of preprogrammed mechanism options.

29. The electronic communications device according to claim 26, wherein there are 10 mechanisms and wherein for all 10 mechanisms, users may generate their own specific set of parameters to achieve greater fluency in their truthful speaking.

30. The electronic communications device according to claim 26, wherein there are 10 mechanisms and wherein for all 10 mechanisms, the method can be adapted to any language by inserting several hundred foreign words consistent with the mechanisms in the word phrase pools.

31. The electronic communications device of claim 26, wherein use of said one or more mechanisms is adaptable to any foreign language by inserting several hundred foreign words of said any foreign language consistent with said one or more mechanisms in said word phrase pools, programming said selected word-phrase pools in said foreign language and said electronic communications device providing simple directions cuing a user on use and providing instructions on how to utilize said one or more mechanisms.

32. The electronic communications device as in claim 26 wherein the electronic communications device is selected from the group consisting of a smart phone, a tablet, a desktop computer, a laptop computer, and a smart watch.

* * * * *